(12) United States Patent
Zhou et al.

(10) Patent No.: US 10,175,840 B2
(45) Date of Patent: Jan. 8, 2019

(54) TERMINAL, TOUCH CONTROL UNIT, TOUCHSCREEN, SCREEN PROTECTOR, AND OPERATION DETECTION APPARATUS AND METHOD

(71) Applicant: Huawei Technologies Co., Ltd., Shenzhen (CN)

(72) Inventors: Jin Zhou, Shanghai (CN); Hang Li, Shenzhen (CN); Chao Meng, Shanghai (CN); Chiaching Chu, Shenzhen (CN); Chingyi Wang, Shenzhen (CN); Bing Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 15/508,210

(22) PCT Filed: Sep. 3, 2014

(86) PCT No.: PCT/CN2014/085854
§ 371 (c)(1),
(2) Date: Mar. 2, 2017

(87) PCT Pub. No.: WO2016/033759
PCT Pub. Date: Mar. 10, 2016

(65) Prior Publication Data
US 2017/0285805 A1     Oct. 5, 2017

(51) Int. Cl.
*G06F 3/045*     (2006.01)
*G06F 3/044*     (2006.01)
(Continued)

(52) U.S. Cl.
CPC .......... *G06F 3/044* (2013.01); *G02F 1/13338* (2013.01); *G02F 1/13439* (2013.01); *G06F 3/0416* (2013.01)

(58) Field of Classification Search
CPC ........ G06F 3/044; G06F 3/0416; G06F 3/041; G06F 3/0488
See application file for complete search history.

(56) References Cited

U.S. PATENT DOCUMENTS 9,019,231 B2 *   4/2015   Minami .................. G06F 3/044
                                                                     345/173
9,086,754 B2 *   7/2015   Tong ..................... G06F 3/0412
(Continued)

FOREIGN PATENT DOCUMENTS

CN        101916502 A     12/2010
CN        101984392 A     3/2011
(Continued)

OTHER PUBLICATIONS

Machine Translation and Abstract of Chinese Publication No. CN101916502, Dec. 15, 2010, 8 pages.
(Continued)

*Primary Examiner* — Vijay Shankar
(74) *Attorney, Agent, or Firm* — Conley Rose, P.C.

(57) ABSTRACT

The present disclosure discloses a terminal, a touch control unit, a touchscreen, a screen protector, and an operation detection apparatus and method, and pertains to the field of terminal control. The terminal includes a touchscreen, a controller connected to the touchscreen, and at least one touch control unit, where the touch control unit includes a detection electrode, an induction electrode, and a conducting wire connecting the detection electrode and the induction electrode. The detection electrode is located outside a touch area of the touchscreen, the induction electrode is located in the touch area of the touchscreen, and the induction electrode is coupled to at least one capacitance node on the touchscreen. An existing capacitance node on the touchscreen identifies a touch operation performed by a user on
(Continued)

the detection electrode disposed outside the touchscreen, and the terminal is controlled according to the touch operation.

22 Claims, 8 Drawing Sheets

(51) Int. Cl.
    *G02F 1/1333*     (2006.01)
    *G02F 1/1343*     (2006.01)
    *G06F 3/041*     (2006.01)

(56) References Cited

U.S. PATENT DOCUMENTS

| | | | |
|---|---|---|---|
| 9,965,086 B2 * | 5/2018 | Ye | G06F 3/0416 |
| 9,971,452 B2 * | 5/2018 | Kubo | G06F 3/03547 |
| 2009/0315838 A1 | 12/2009 | Geiger | |
| 2012/0075238 A1 | 3/2012 | Minami et al. | |
| 2013/0127762 A1 | 5/2013 | Tong | |
| 2015/0370406 A1 | 12/2015 | Zhao | |
| 2016/0132178 A1 | 5/2016 | Ye et al. | |
| 2016/0212251 A1 | 7/2016 | Oh et al. | |
| 2017/0010752 A1 | 1/2017 | Kubo et al. | |

FOREIGN PATENT DOCUMENTS

| | | |
|---|---|---|
| CN | 102419670 A | 4/2012 |
| CN | 102810006 A | 12/2012 |
| CN | 103336603 A | 10/2013 |
| CN | 103699260 A | 4/2014 |
| CN | 103984455 A | 8/2014 |
| CN | 104010053 A | 8/2014 |
| JP | 2009123193 A | 6/2009 |
| JP | 2012123448 A | 6/2012 |
| JP | 2012150594 A | 8/2012 |
| JP | 2013532877 A | 8/2013 |
| WO | 0159558 A1 | 8/2001 |

OTHER PUBLICATIONS

Foreign Communication From a Counterpart Application, Chinese Application No. 201480065807.1, Chinese Office Action dated Jun. 4, 2018, 8 pages.
Machine Translation and Abstract of Japanese Publication No. JP2012123448, Jun. 28, 2012, 33 pages.
Foreign Communication From a Counterpart Application, Japanese Application No. 2017-512331, Japanese Office Action dated Dec. 19, 2017, 6 pages.
Foreign Communication From a Counterpart Application, Japanese Application No. 2017-512331, English Translation of Japanese Office Action dated Dec. 19, 2017, 7 pages.
Foreign Communication From a Counterpart Application, PCT Application No. PCT/CN2014/085854, English Translation of International Search Report dated May 29, 2015, 2 pages.
Foreign Communication From a Counterpart Application, PCT Application No. PCT/CN2014/085854, English Translation of Written Opinion dated May 29, 2015, 9 pages.
Machine Translation and Abstract of Chinese Publication No. CN103984455, Aug. 13, 2014, 10 pages.
Foreign Communication From a Counterpart Application, European Application No. 14901194.2, Extended European Search Report dated Aug. 8, 2017, 10 pages.

* cited by examiner

TERMINAL, TOUCH CONTROL UNIT, TOUCHSCREEN, SCREEN PROTECTOR, AND OPERATION DETECTION APPARATUS AND METHOD

CROSS-REFERENCE TO RELATED APPLICATION

This application is a U.S. National Stage of International Patent Application No. PCT/CN2014/085854 filed on Sep. 3, 2014, which is hereby incorporated by reference in its entirety.

TECHNICAL FIELD

The present disclosure relates to the field of terminal control, and in particular, to a terminal, a touch control unit, a touchscreen, a screen protector, and an operation detection apparatus and method.

BACKGROUND

With continuous development of electronic technologies, a terminal, such as a smartphone, a tablet computer, and an electronic book (e-book) reader, that includes a touchscreen is increasingly popular.

A finger of a user is prone to obstruct content displayed on a touchscreen when the user performs a touch operation on the touchscreen to control a terminal. To minimize an obstruction of the screen caused by the touch operation by the user, for an existing terminal, independent touch keys are usually disposed outside the touchscreen of the terminal, and these touch keys are correspondingly set as commonly-used function keys, such as a menu key, a return key, and a home key. With a structure similar to the touchscreen, the touch keys may include a complete capacitance node, and the capacitance node may include two layers of conductors that are insulated from each other. A charge transfer occurs between an upper-layer conductor of the capacitance node and the finger when the user touches a touch key, accordingly, a capacitance of the capacitance node changes, and the terminal may detect, according to the change of the capacitance, that the user performs a touch control operation on the touch key, and then perform a function instruction corresponding to the touch key.

In a process of implementing the present disclosure, the inventor finds that the other approaches include at least the following problems.

The existing touch keys disposed outside the touchscreen are generally independent touch detection components that need to occupy relatively large space of a terminal, are more costly, and have a limited corresponding function. Therefore, user experience is not good.

SUMMARY

To resolve the problem that a touch key disposed outside a touchscreen is generally an independent touch detection component, which needs to occupy relatively large space of a terminal, is more costly, and has a limited corresponding function, and therefore user experience is not good, embodiments of the present disclosure provide a terminal, a touch control unit, a touchscreen, a screen protector, and an operation detection apparatus and method. The technical solutions are as follows.

According to a first aspect, a terminal is provided, where the terminal includes a touchscreen, a controller connected to the touchscreen, and at least one touch control unit. The touch control unit includes a detection electrode, an induction electrode, and a conducting wire connecting the detection electrode and the induction electrode. The detection electrode is located outside a touch area of the touchscreen, the induction electrode is located in the touch area of the touchscreen, and the induction electrode is coupled to at least one capacitance node on the touchscreen. The controller is configured to obtain a capacitance change parameter of the at least one capacitance node and a capacitance change parameter of a node adjacent to the at least one capacitance node, where the capacitance change parameter indicates a capacitance change value of a corresponding capacitance node during a period of time. The controller is configured to detect, according to the capacitance change parameter of the at least one capacitance node and the capacitance change parameter of the node adjacent to the at least one capacitance node, whether the detection electrode receives a touch operation, and the controller is configured to generate a touch event used to indicate the touch operation when a detection result is that the detection electrode receives the touch operation.

In a first possible implementation manner of the first aspect, the controller is configured to detect whether a capacitance change value included in the capacitance change parameter of the at least one capacitance node is greater than a first preset threshold, and detect whether a capacitance change value included in the capacitance change parameter of the node adjacent to the at least one capacitance node is less than or equal to the first preset threshold, and the controller is configured to determine that the detection electrode receives the touch operation when the capacitance change value included in the capacitance change parameter of the at least one capacitance node is greater than the first preset threshold, and the capacitance change value included in the capacitance change parameter of the node adjacent to the at least one capacitance node is less than or equal to the first preset threshold.

With reference to the first aspect or the first possible implementation manner of the first aspect, in a second possible implementation manner of the first aspect, before determining that the detection electrode receives the touch operation, the controller is configured to detect whether capacitance change values included in capacitance change parameters of capacitance nodes that are separately coupled to N induction sub-electrodes are in a preset proportion, and the controller is configured to execute the step of determining that the detection electrode receives the touch operation when the capacitance change values included in the capacitance change parameters of the capacitance nodes that are separately coupled to the N induction sub-electrodes are in the preset proportion, where the induction electrode includes the N induction sub-electrodes, the N induction sub-electrodes are insulated from each other, the capacitance nodes that are separately coupled to the N induction sub-electrodes are not adjacent to each other, and N is an integer and N≥2.

In a third possible implementation manner of the first aspect, the controller is configured to detect whether a capacitance change value included in the capacitance change parameter of the at least one capacitance node accords with a predetermined value, where the predetermined value is different from a capacitance change value of the at least one capacitance node when the at least one capacitance node receives a touch operation. The controller is configured to detect whether a capacitance change value included in the capacitance change parameter of the node adjacent to the at least one capacitance node is less than or equal to a second preset threshold, and the controller is configured to determine that the detection electrode receives the touch operation when the capacitance change value included in the capacitance change parameter of the at least one capacitance node accords with the predetermined value, and the capacitance change value included in the capacitance change parameter of the node adjacent to the at least one capacitance node is less than or equal to the second preset threshold.

According to a second aspect, a touch control unit is provided, and is applied to a terminal including a touchscreen and a controller, where the touch control unit includes a detection electrode, an induction electrode, and a conducting wire connecting the detection electrode and the induction electrode. The detection electrode is located outside a touch area of the touchscreen, the induction electrode is located in the touch area of the touchscreen, and the induction electrode is coupled to at least one capacitance node on the touchscreen such that when detecting, according to a capacitance change parameter of the at least one capacitance node and a capacitance change parameter of a node adjacent to the at least one capacitance node, that the detection electrode receives a touch operation, the controller generates a touch event used to indicate the touch operation, where the capacitance change parameter indicates a capacitance change value of a corresponding capacitance node during a period of time.

In a first possible implementation manner of the second aspect, the induction electrode includes N induction sub-electrodes, the N induction sub-electrodes are insulated from each other, capacitance nodes that are separately coupled to the N induction sub-electrodes are not adjacent to each other, and N is an integer and $N \geq 2$.

With reference to the first possible implementation manner of the second aspect, in a second possible implementation manner of the second aspect, the detection electrode is a single electrode, and the N induction sub-electrodes are separately connected to the detection electrode using the conducting wire.

With reference to the first possible implementation manner of the second aspect, in a third possible implementation manner of the second aspect, when the detection electrode receives the touch operation, capacitance change parameters of capacitance nodes separately corresponding to the N induction sub-electrodes are in a preset proportion.

With reference to the first possible implementation manner of the second aspect, in a fourth possible implementation manner of the second aspect, the detection electrode includes N detection sub-electrodes, the N detection sub-electrodes are insulated from each other, and the N detection sub-electrodes are connected to the N induction sub-electrodes in a one-to-one correspondence manner using the conducting wire.

With reference to the first possible implementation manner of the second aspect, in a fifth possible implementation manner of the second aspect, an area of each induction sub-electrode does not exceed an area of two capacitance nodes.

With reference to the second aspect or any one of the first to the fifth possible implementation manners of the second aspect, in a sixth possible implementation manner of the second aspect, a width of the conducting wire $\leq 1$ millimeter (mm).

With reference to the second aspect or any one of the first to the fifth possible implementation manner of the second aspect, in a seventh possible implementation manner of the second aspect, when the detection electrode receives the touch operation, a capacitance change value of the at least one capacitance node accords with a predetermined value, where the predetermined value is different from a capacitance change value of the at least one capacitance node when the at least one capacitance node receives the touch operation.

According to a third aspect, a touchscreen is provided, where the touchscreen includes at least one touch control unit according to the second aspect or any one of the possible implementation manners of the second aspect.

According to a fourth aspect, a screen protector is provided, and is configured to cover an upper surface of a touchscreen, where the screen protector includes at least one touch control unit according to the second aspect or any one of the possible implementation manners of the second aspect.

According to a fifth aspect, an operation detection apparatus is provided, and is applied to a terminal including a touchscreen, a controller connected to the touchscreen, and at least one touch control unit, where the touch control unit includes a detection electrode, an induction electrode, and a conducting wire connecting the detection electrode and the induction electrode. The detection electrode is located outside a touch area of the touchscreen, the induction electrode is located in the touch area of the touchscreen, and the induction electrode is coupled to at least one capacitance node on the touchscreen. The apparatus includes a parameter acquiring module configured to obtain a capacitance change parameter of the at least one capacitance node and a capacitance change parameter of a node adjacent to the at least one capacitance node, where the capacitance change parameter indicates a capacitance change value of a corresponding capacitance node during a period of time, a detection module configured to detect, according to the capacitance change parameter of the at least one capacitance node and the capacitance change parameter of the node adjacent to the at least one capacitance node, whether the detection electrode receives a touch operation, and an event generating module configured to generate a touch event used to indicate the touch operation when a detection result is that the detection electrode receives the touch operation.

In a first possible implementation manner of the fifth aspect, the detection module includes a first detection unit configured to detect whether a capacitance change value included in the capacitance change parameter of the at least one capacitance node is greater than a first preset threshold, a second detection unit configured to detect whether a capacitance change value included in the capacitance change parameter of the node adjacent to the at least one capacitance node is less than or equal to the first preset threshold, and a first determining unit configured to determine that the detection electrode receives the touch operation when the capacitance change value included in the capacitance change parameter of the at least one capacitance node is greater than the first preset threshold, and the capacitance change value included in the capacitance change parameter of the node adjacent to the at least one capacitance node is less than or equal to the first preset threshold.

With reference to the fifth aspect or the first possible implementation manner of the fifth aspect, in a second possible implementation manner of the fifth aspect, the detection module further includes a third detection unit configured to detect whether capacitance change values included in capacitance change parameters of capacitance nodes that are separately coupled to N induction sub-electrodes are in a preset proportion before the first determining unit determines that the detection electrode receives the touch operation, and the first determining unit is configured to execute the step of determining that the detection electrode receives the touch operation when the capacitance change values included in the capacitance change parameters of the capacitance nodes that are separately coupled to the N induction sub-electrodes are in the preset proportion, where the induction electrode includes the N induction sub-electrodes, the N induction sub-electrodes are insulated from each other, the capacitance nodes that are separately coupled to the N induction sub-electrodes are not adjacent to each other, and N is an integer and N≥2.

In a third possible implementation manner of the fifth aspect, the detection module includes a fourth detection module configured to detect whether a capacitance change value included in the capacitance change parameter of the at least one capacitance node accords with a predetermined value, where the predetermined value is different from a capacitance change value of the at least one capacitance node when the at least one capacitance node receives a touch operation, a fifth detection unit configured to detect whether a capacitance change value included in the capacitance change parameter of the node adjacent to the at least one capacitance node is less than or equal to a second preset threshold, and a second determining unit configured to determine that the detection electrode receives the touch operation when the capacitance change value included in the capacitance change parameter of the at least one capacitance node accords with the predetermined value, and the capacitance change value included in the capacitance change parameter of the node adjacent to the at least one capacitance node is less than or equal to the second preset threshold.

According to a sixth aspect, an operation detection method is provided, and is applied to a terminal including a touchscreen, a controller connected to the touchscreen, and at least one touch control unit, where the touch control unit includes a detection electrode, an induction electrode, and a conducting wire connecting the detection electrode and the induction electrode, the detection electrode is located outside a touch area of the touchscreen, the induction electrode is located in the touch area of the touchscreen, and the induction electrode is coupled to at least one capacitance node on the touchscreen, the method includes acquiring a capacitance change parameter of the at least one capacitance node and a capacitance change parameter of a node adjacent to the at least one capacitance node, where the capacitance change parameter indicates a capacitance change value of a corresponding capacitance node during a period of time, detecting, according to the capacitance change parameter of the at least one capacitance node and the capacitance change parameter of the node adjacent to the at least one capacitance node, whether the detection electrode receives a touch operation, and generating, when a detection result is that the detection electrode receives the touch operation, a touch event used to indicate the touch operation.

In a first possible implementation manner of the sixth aspect, detecting, according to the capacitance change parameter of the at least one capacitance node and the capacitance change parameter of the node adjacent to the at least one capacitance node, whether the detection electrode receives a touch operation includes detecting whether a capacitance change value included in the capacitance change parameter of the at least one capacitance node is greater than a first preset threshold, and detecting whether a capacitance change value included in the capacitance change parameter of the node adjacent to the at least one capacitance node is less than or equal to the first preset threshold, and when the capacitance change value included in the capacitance change parameter of the at least one capacitance node is greater than the first preset threshold, and the capacitance change value included in the capacitance change parameter of the node adjacent to the at least one capacitance node is less than or equal to the first preset threshold, determining that the detection electrode receives the touch operation.

With reference to the sixth aspect or the first possible implementation manner of the sixth aspect, in a second possible implementation manner of the sixth aspect, the method further includes detecting, before determining that the detection electrode receives the touch operation, whether capacitance change values included in capacitance change parameters of capacitance nodes that are separately coupled to N induction sub-electrodes are in a preset proportion, and executing, when the capacitance change values included in the capacitance change parameters of the capacitance nodes that are separately coupled to the N induction sub-electrodes are in the preset proportion, the step of determining that the detection electrode receives the touch operation, where the induction electrode includes the N induction sub-electrodes, the N induction sub-electrodes are insulated from each other, the capacitance nodes that are separately coupled to the N induction sub-electrodes are not adjacent to each other, and N is an integer and N≥2.

In a third possible implementation manner of the sixth aspect, detecting, according to the capacitance change parameter of the at least one capacitance node and the capacitance change parameter of the node adjacent to the at least one capacitance node, whether the detection electrode receives a touch operation includes detecting whether a capacitance change value included in the capacitance change parameter of the at least one capacitance node accords with a predetermined value, and detecting whether a capacitance change value included in the capacitance change parameter of the node adjacent to the at least one capacitance node is less than or equal to a second preset threshold, where the predetermined value is different from a capacitance change value of the at least one capacitance node when the at least one capacitance node receives a touch operation, and determining that the detection electrode receives the touch operation when the capacitance change value included in the capacitance change parameter of the at least one capacitance node accords with the predetermined value, and the capacitance change value included in the capacitance change parameter of the node adjacent to the at least one capacitance node is less than or equal to the second preset threshold.

The technical solutions provided in the embodiments of the present disclosure bring the following beneficial effects.

A detection electrode is disposed outside a touch area of a touchscreen, an induction electrode is disposed in the touch area, and the detection electrode and the induction electrode are connected using a conducting wire. When a user operates the detection electrode, a capacitance change value of a capacitance node coupled to the induction electrode is caused to change such that a controller can detect, according to a capacitance change of the capacitance node coupled to the induction electrode, whether the detection electrode receives a touch operation, and generate a corresponding touch event when detecting that the detection electrode receives the touch operation. An existing capacitance node on the touchscreen identifies a touch operation performed by the user on the detection electrode disposed outside the touchscreen, and a terminal is controlled according to the touch operation. This may further increase a quantity of keys of the terminal and expand a control manner of the terminal with only a need to occupy quite small space and spend quite low costs. Therefore, user experience is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
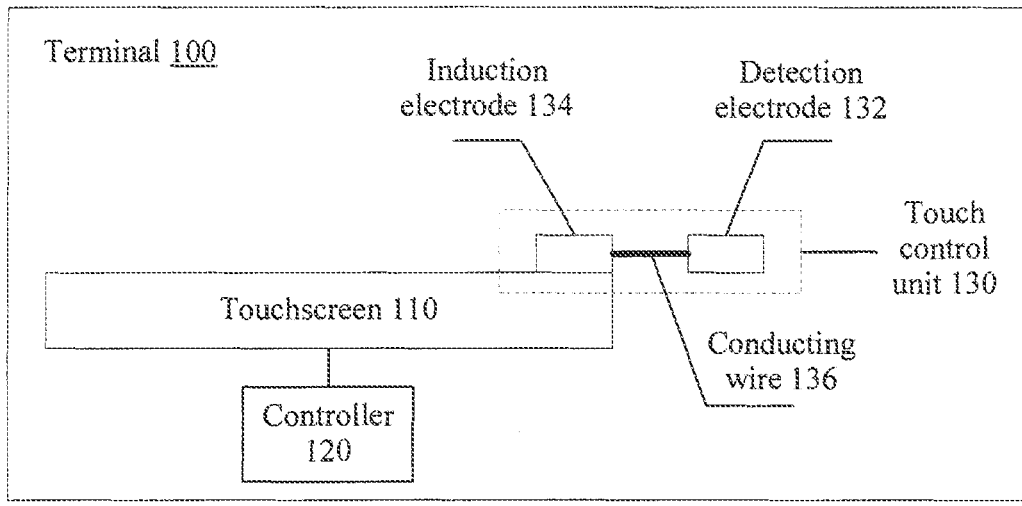
FIG. 1 is a schematic structural diagram of a terminal according to an embodiment of the present disclosure.

Referring to FIG. 1, FIG. 1 shows a schematic structural diagram of a terminal according to an embodiment of the present disclosure. The terminal 100 may include a touchscreen 110, a controller 120 connected to the touchscreen 110, and at least one touch control unit 130. The touch control unit 130 includes a detection electrode 132, an induction electrode 134, and a conducting wire 136 connecting the detection electrode 132 and the induction electrode 134.

The detection electrode 132 is located outside a touch area of the touchscreen 110, the induction electrode 134 is located in the touch area of the touchscreen 110, and the induction electrode 134 is coupled to at least one capacitance node (not shown) on the touchscreen 110.

The controller 120 is configured to obtain a capacitance change parameter of the at least one capacitance node and a capacitance change parameter of a node adjacent to the at least one capacitance node, where the capacitance change parameter indicates a capacitance change value of a corresponding capacitance node during a period of time.

The controller 120 is configured to detect, according to the capacitance change parameter of the at least one capacitance node and the capacitance change parameter of the node adjacent to the at least one capacitance node, whether the detection electrode 132 receives a touch operation.

The controller 120 is configured to generate a touch event used to indicate the touch operation when a detection result is that the detection electrode 132 receives the touch operation.

Both the detection electrode 132 and the induction electrode 134 are made of a conducting material. A charge in the detection electrode 132 is transferred when a user performs a touch operation on the detection electrode 132 outside the touchscreen 110, and therefore a charge in the induction electrode 134 is also transferred accordingly. A capacitance change value of a capacitance node that is coupled to the induction electrode 134 and that is on the touchscreen 110 is also caused to change when the charge in the induction electrode 134 is transferred. The controller 120 connected to the touchscreen 110 scans capacitance change values of all capacitance nodes on the touchscreen 110, and when detecting that a capacitance node coupled to an induction node changes, the controller 120 may determine, according to a capacitance change value of the capacitance node coupled to the induction node, a capacitance change value of a capacitance node adjacent to the capacitance node coupled to the induction node, and locations of these capacitance nodes, whether capacitance changes of these capacitance nodes are capacitance changes caused by touching the detection electrode 132 by the user or capacitance changes caused by touching the touchscreen 110 by the user. If the controller 120 determines that the capacitance changes of these capacitance nodes are capacitance changes caused by touching the detection electrode 132 by the user, the controller 120 generates a touch event corresponding to a touch operation performed by the user on the detection electrode 132 such that the terminal 100 executes a corresponding control operation according to the touch event.

It should be noted that, in this embodiment of the present disclosure, a touch event generated when a first controller detects that the user touches the detection electrode 132 is different from a touch event generated when the user performs a touch operation on the touch area in which the induction electrode 134 is located, that is, the detection electrode 132 is an independent touch key, and has a corresponding control instruction, which is irrelevant to content displayed in a touchscreen area in which the induction electrode 134 is located.

In addition, the touch control unit 130 may be directly disposed on the touchscreen 110 of the terminal 100, for example, the touch control unit 130 may be disposed on an upper surface or a lower surface of the touchscreen 110 or inside the touchscreen 110, provided that the induction electrode 134 in the touch control unit 130 is insulated from and coupled to a capacitance node on the touchscreen 110.

Alternatively, the touch control unit 130 may be disposed on a screen protector covering an upper surface of the touchscreen 110, for example, the touch control unit 130 may be disposed on an upper surface or a lower surface of the screen protector or inside the screen protector, provided that the induction electrode 134 in the touch control unit 130 is insulated from and coupled to a capacitance node on the touchscreen 110.

In conclusion, according to the terminal 100 provided in this embodiment of the present disclosure, a detection electrode 132 is disposed outside a touch area of a touchscreen 110, an induction electrode 134 is disposed in the touch area, and the detection electrode 132 and the induction electrode 134 are connected using a conducting wire 136. When a user operates the detection electrode 132, a capacitance change value of a capacitance node coupled to the induction electrode 134 is caused to change such that a controller can detect, according to a capacitance change of the capacitance node coupled to the induction electrode 134, whether the detection electrode 132 receives a touch operation, and generate a corresponding touch event when detecting that the detection electrode 132 receives the touch operation. An existing capacitance node on the touchscreen 110 identifies a touch operation performed by the user on the detection electrode 132 disposed outside the touchscreen 110, and the terminal 100 is controlled according to the touch operation. This may further increase a quantity of keys of the terminal 100 and expand a control manner of the terminal 100 with only a need to occupy quite small space and spend quite low costs. Therefore, user experience is improved.

Figure 2:
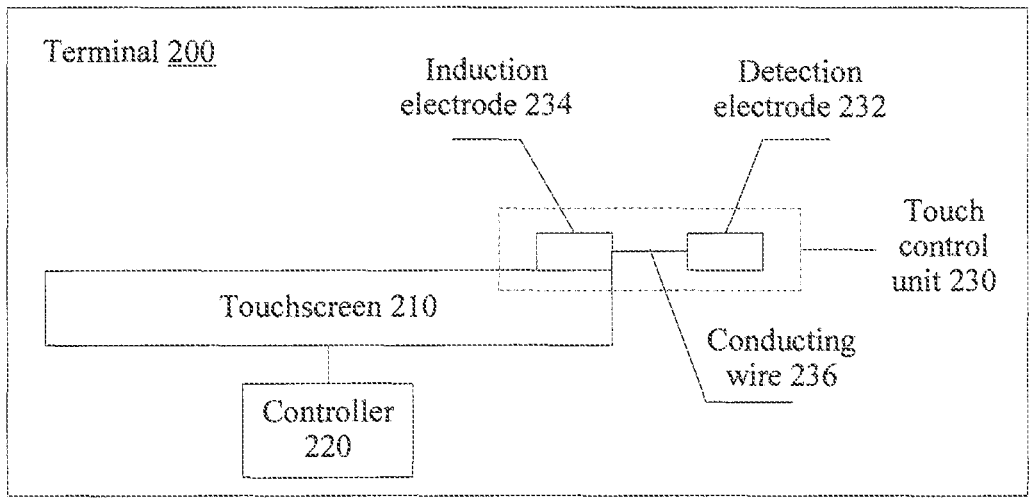
FIG. 2 is a schematic structural diagram of a terminal according to another embodiment of the present disclosure.

For further description of the foregoing terminal shown in FIG. 1, refer to FIG. 2. FIG. 2 shows a schematic structural diagram of a terminal according to another embodiment of the present disclosure. The terminal 200 may include a touchscreen 210, a controller 220 connected to the touchscreen 210, and at least one touch control unit 230, where the touch control unit 230 includes a detection electrode 232, an induction electrode 234, and a conducting wire 236 connecting the detection electrode 232 and the induction electrode 234.

The detection electrode 232 is located outside a touch area of the touchscreen 210, the induction electrode 234 is located in the touch area of the touchscreen 210, and the induction electrode 234 is coupled to at least one capacitance node (not shown) on the touchscreen 210.

The controller 220 is configured to obtain a capacitance change parameter of the at least one capacitance node and a capacitance change parameter of a node adjacent to the at least one capacitance node, where the capacitance change parameter indicates a capacitance change value of a corresponding capacitance node during a period of time.

The controller 220 is configured to detect, according to the capacitance change parameter of the at least one capacitance node and the capacitance change parameter of the node adjacent to the at least one capacitance node, whether the detection electrode 232 receives a touch operation.

The controller 220 is configured to generate a touch event used to indicate the touch operation when a detection result is that the detection electrode 232 receives the touch operation.

Both the detection electrode 232 and the induction electrode 234 are made of a conducting material. When a user performs a touch operation on the detection electrode 232 outside the touchscreen 210, a charge in the detection electrode 232 is transferred, and therefore a charge in the induction electrode 234 is also transferred accordingly. When the charge in the induction electrode 234 is transferred, a capacitance change value of a capacitance node that is coupled to the induction electrode 234 and that is on the touchscreen 210 is also caused to change. The controller 220 connected to the touchscreen 210 scans capacitance change values of all capacitance nodes on the touchscreen 210, and when detecting that a capacitance node coupled to an induction node changes, the controller 220 may determine, according to a capacitance change value of the capacitance node coupled to the induction node, a capacitance change value of a capacitance node adjacent to the capacitance node coupled to the induction node, and locations of these capacitance nodes, whether capacitance changes of these capacitance nodes are capacitance changes caused by touching the detection electrode 232 by the user or capacitance changes caused by touching the touchscreen by the user. If the controller 220 determines that the capacitance changes of these capacitance nodes are capacitance changes caused by touching the detection electrode 232 by the user, the controller 220 generates a touch event corresponding to a touch operation performed by the user on the detection electrode 232 such that the terminal 200 executes a corresponding control operation according to the touch event.

It should be noted that, in this embodiment of the present disclosure, a touch event generated when a first controller detects that the user touches the detection electrode 232 is different from a touch event generated when the user performs a touch operation on the touch area in which the induction electrode 234 is located, that is, the detection electrode 232 is an independent touch key, and has a corresponding control instruction, which is irrelevant to content displayed in a touchscreen area in which the induction electrode 234 is located.

In addition, the touch control unit 230 may be directly disposed on the touchscreen 210 of the terminal 200, for example, the touch control unit 230 may be disposed on an upper surface or a lower surface of the touchscreen 210 or inside the touchscreen 210, provided that the induction electrode 234 in the touch control unit 230 is insulated from and coupled to a capacitance node on the touchscreen 210.

Alternatively, the touch control unit 230 may be disposed on a screen protector covering an upper surface of the touchscreen 210, for example, the touch control unit 230 may be disposed on an upper surface or a lower surface of the screen protector or inside the screen protector, provided that the induction electrode 234 in the touch control unit 230 is insulated from and coupled to a capacitance node on the touchscreen 210.

Optionally, the controller 220 is configured to detect whether a capacitance change value included in the capacitance change parameter of the at least one capacitance node is greater than a first preset threshold, and detect whether a capacitance change value included in the capacitance change parameter of the node adjacent to the at least one capacitance node is less than or equal to the first preset threshold.

The controller 220 is configured to determine that the detection electrode 232 receives the touch operation when the capacitance change value included in the capacitance change parameter of the at least one capacitance node is greater than the first preset threshold, and the capacitance change value included in the capacitance change parameter of the node adjacent to the at least one capacitance node is less than or equal to the first preset threshold.

Further, before determining that the detection electrode 232 receives the touch operation, the controller 220 is configured to detect whether capacitance change values included in capacitance change parameters of capacitance nodes that are separately coupled to N induction sub-electrodes (not shown) are in a preset proportion.

The controller 220 is configured to execute the step of determining that the detection electrode 232 receives the touch operation when the capacitance change values included in the capacitance change parameters of the capacitance nodes that are separately coupled to the N induction sub-electrodes are in the preset proportion, where the induction electrode 234 includes the N induction sub-electrodes, the N induction sub-electrodes are insulated from each other, the capacitance nodes that are separately coupled to the N induction sub-electrodes are not adjacent to each other, and N is an integer and N≥2.

For example, when detecting that a capacitance change value of a capacitance node coupled to the induction electrode 234 is relatively large, and that a capacitance change value of another node adjacent to the capacitance node is relatively small, the controller 220 may consider that a capacitance change of the capacitance node coupled to the induction electrode 234 is caused by a charge transfer in the induction electrode 234, and therefore can determine that the detection electrode 232 connected to the induction electrode 234 receives a touch operation of the user.

In an actual application, when the user performs a touch operation on the touchscreen 200, and a touch area only includes a capacitance node coupled to the induction electrode 234, the controller 220 may incorrectly consider that the detection electrode 232 receives a user operation, thereby causing erroneous detection. For the purpose of reducing a possibility of erroneous detection of the controller 220 and further improving detection accuracy, the induction electrode 234 may be divided into N parts, where each part is separately connected to the same detection electrode 232 using a conducting wire 236, all the parts are separately coupled to different capacitance nodes, and these capacitance nodes are not adjacent to each other. When detecting that capacitance change values of the capacitance nodes coupled to the N parts of the induction electrode 234 meet a condition, and that capacitance change values of other capacitance nodes adjacent to these capacitance nodes do not meet the condition, the controller 220 can determine that capacitance changes of the capacitance nodes coupled to the N parts of the induction electrode 234 are capacitance changes caused by a touch operation performed on the detection electrode 232 by the user, instead of being caused by a touch operation performed on these capacitance nodes on the touchscreen 210 by the user.

Figures 3, 4:
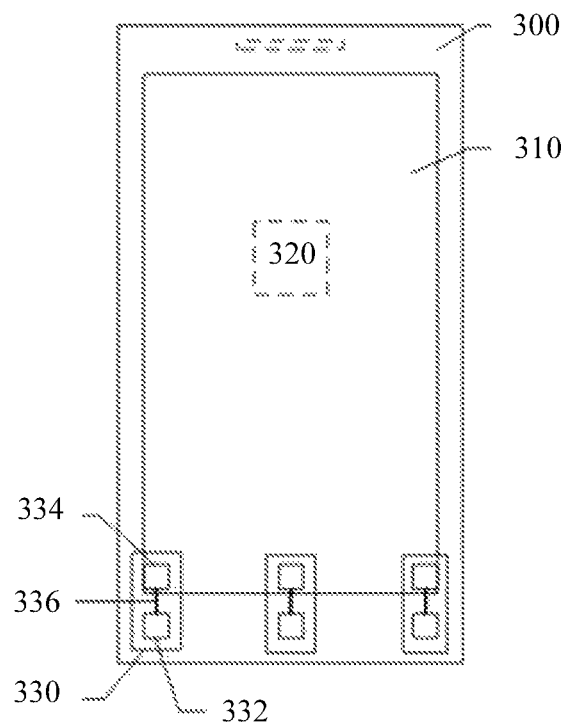
FIG. 3 is a schematic diagram of a capacitance change value according to another embodiment of the present disclosure.
FIG. 4 is a schematic structural diagram of a touch control unit according to an embodiment of the present disclosure.

Referring to a schematic diagram of a capacitance change value shown in FIG. 3, the induction electrode 234 includes three induction sub-electrodes, and capacitance change values corresponding to capacitance nodes coupled to three induction sub-nodes are values shown in dashed circles in FIG. 3. A first preset value set by the terminal is 20. After acquiring capacitance change values of all capacitance nodes, the controller 220 detects that all the capacitance change values of the capacitance nodes separately coupled to the three induction sub-electrodes exceed 20, and that none of capacitance change values of other capacitance nodes adjacent to these three capacitance nodes exceeds 20, and therefore can determine that the user performs a touch operation on the detection electrode 232 corresponding to the induction electrode 234.

Further, a capacitance change value that is of a capacitance node and that is caused by the induction electrode 234 is determined by area sizes of the induction electrode 234 and the detection electrode 232 and impedance between the induction electrode 234 and the detection electrode 232. When the touch control unit 230 is being set, area sizes of all the induction sub-electrodes and the detection electrode 232 that are in the touch control unit 230 and impedance of the conducting wire 236 may be set to fixed values such that when the user performs a touch operation on the detection electrode 232, capacitance change values of capacitance nodes coupled to all the induction sub-electrodes accord with a predetermined proportion. Therefore, detection accuracy is further improved.

Referring to the schematic diagram of a capacitance change value shown in FIG. 3, after acquiring the capacitance change values of all the capacitance nodes, the controller 220 detects that the capacitance change values of the capacitance nodes separately coupled to the three induction sub-electrodes are separately 50, 45, and 40, which accords with a preset proportion 10:9:8, and that none of the capacitance change values of the other capacitance nodes adjacent to these three capacitance nodes exceeds 20, and therefore can determine that the user performs a touch operation on the detection electrode 232 corresponding to the induction electrode 234.

Optionally, the controller 220 is configured to detect whether a capacitance change value included in the capacitance change parameter of the at least one capacitance node accords with a predetermined value, where the predetermined value is different from a capacitance change value of the at least one capacitance node when the at least one capacitance node receives a touch operation.

The controller 220 is configured to detect whether a capacitance change value included in the capacitance change parameter of the node adjacent to the at least one capacitance node is less than or equal to a second preset threshold.

The controller 220 is configured to determine that the detection electrode 232 receives the touch operation when the capacitance change value included in the capacitance change parameter of the at least one capacitance node accords with the predetermined value, and the capacitance change value included in the capacitance change parameter of the node adjacent to the at least one capacitance node is less than or equal to the second preset threshold.

A capacitance change value of a capacitance node is relatively fixed when the user uses a finger to perform a touch operation on the touchscreen 210, and the area sizes of all the induction sub-electrodes and the detection electrode 232 that are in the touch control unit 230 and the impedance of the conducting wire 236 may be set to fixed values. Therefore, when the user performs a touch operation on the detection electrode 232, a capacitance change value of a capacitance node coupled to the induction electrode 234 is different from a capacitance change value of the capacitance node when the user performs a touch operation on the touch area on the touchscreen 210, thereby achieving an effect of distinguishing between an operation performed on the touch area by the user and an operation performed on the detection electrode 232 by the user.

For example, if a capacitance change value of a capacitance node is 100 when the user uses a finger to perform a touch operation on the touchscreen 210, the area sizes of all the induction sub-electrodes and the detection electrode 232 that are in the touch control unit 230 and the impedance of the conducting wire 236 may be set to fixed values such that when the user performs a touch operation on the detection electrode 232, a capacitance change value of a capacitance node coupled to the induction electrode 234 is 50. When detecting that the capacitance change value of the capacitance node coupled to the induction electrode 234 is approximately 50, and that a capacitance change value of an adjacent capacitance node is below 20, the controller 220 can determine that the user performs a touch operation on the detection electrode 232.

In conclusion, according to the terminal 200 provided in this embodiment of the present disclosure, a detection electrode 232 is disposed outside a touch area of a touchscreen 210, an induction electrode 234 is disposed in the touch area, and the detection electrode 232 and the induction electrode 234 are connected using a conducting wire 236. When a user operates the detection electrode 232, a capacitance change value of a capacitance node coupled to the induction electrode 234 is caused to change such that a controller 220 can detect, according to a capacitance change of the capacitance node coupled to the induction electrode 234, whether the detection electrode 232 receives a touch operation, and generate a corresponding touch event when detecting that the detection electrode 232 receives the touch operation. An existing capacitance node on the touchscreen 210 identifies a touch operation performed by the user on the detection electrode 232 disposed outside the touchscreen 210, and the terminal 200 is controlled according to the touch operation. This may further increase a quantity of keys of the terminal 200 and expand a control manner of the terminal 200 with only a need to occupy quite small space and spend quite low costs. Therefore, user experience is improved.

Further, according to the terminal 200 provided in this embodiment of the present disclosure, the induction electrode 234 is divided into N induction sub-electrodes, where the N induction sub-electrodes are insulated from each other, and capacitance nodes that are separately coupled to the N induction sub-electrodes are not adjacent to each other. When detecting that capacitance change values of all capacitance nodes corresponding to the N induction sub-electrodes meet a condition, and that capacitance change values of other adjacent capacitance nodes do not meet the condition, the controller 220 determines that the user performs a touch operation on the detection electrode 232. Therefore, a misoperation is reduced, and detection accuracy is further improved.

In addition, according to the terminal 200 provided in this embodiment of the present disclosure, when the detection electrode 232 receives a touch operation, the capacitance change values of the capacitance nodes separately corresponding to the N induction sub-electrodes are set to be in a preset proportion. Therefore, a misoperation is reduced, and the detection accuracy is further improved.

Referring to FIG. 4, FIG. 4 shows a schematic structural diagram of a touch control unit according to an embodiment of the present disclosure. The touch control unit 330 is applied to a terminal 300 including a touchscreen 310 and a controller 320, for example, the terminal 300 may be the terminal 100 shown in FIG. 1 or the terminal 200 shown in FIG. 2, and the touch control unit 330 includes a detection electrode 332, an induction electrode 334, and a conducting wire 336 connecting the detection electrode 332 and the induction electrode 334.

The detection electrode 332 is located outside a touch area of the touchscreen 310, the induction electrode 334 is located in the touch area of the touchscreen 310, and the induction electrode 334 is coupled to at least one capacitance node (not shown) on the touchscreen 310 such that when detecting, according to a capacitance change parameter of the at least one capacitance node and a capacitance change parameter of a node adjacent to the at least one capacitance node, that the detection electrode 332 receives a touch operation, the controller 320 in the terminal 300 generates a touch event used to indicate the touch operation, where the capacitance change parameter indicates a capacitance change value of a corresponding capacitance node during a period of time.

Both the detection electrode 332 and the induction electrode 334 are made of a conducting material. When a user performs a touch operation on the detection electrode 332 outside the touchscreen 310, a charge in the detection electrode 332 is transferred, and therefore a charge in the induction electrode 334 is also transferred accordingly.

When the charge in the induction electrode 334 is transferred, a capacitance change value of a capacitance node that is coupled to the induction electrode 334 and that is on the touchscreen 310 is also caused to change. The controller 320 connected to the touchscreen 310 scans capacitance change values of all capacitance nodes on the touchscreen 310, and when detecting that a capacitance node coupled to an induction node 334 changes, the controller 320 may determine, according to a capacitance change value of the capacitance node coupled to the induction node 334, a capacitance change value of a capacitance node adjacent to the capacitance node coupled to the induction node 334, and locations of these capacitance nodes, whether capacitance changes of these capacitance nodes are capacitance changes caused by touching the detection electrode 332 by the user or capacitance changes caused by touching the touchscreen 310 by the user. If the controller 320 determines that the capacitance changes of these capacitance nodes are capacitance changes caused by touching the detection electrode 332 by the user, the controller 320 generates a touch event corresponding to a touch operation performed by the user on the detection electrode 332 such that the terminal 300 executes a corresponding control operation according to the touch event.

In conclusion, according to the touch control unit 330 provided in this embodiment of the present disclosure, a detection electrode 332 is disposed outside a touch area of a touchscreen 310 of a terminal 300, an induction electrode 334 is disposed in the touch area, and the detection electrode 332 and the induction electrode 334 are connected using a conducting wire 336. When a user operates the detection electrode 332, a capacitance change value of a capacitance node coupled to the induction electrode 334 is caused to change such that a controller 320 can detect, according to a capacitance change of the capacitance node coupled to the induction electrode 334, whether the detection electrode 332 receives a touch operation, and generate a corresponding touch event when detecting that the detection electrode 332 receives the touch operation. An existing capacitance node on the touchscreen 310 identifies a touch operation performed by the user on the detection electrode 332 disposed outside the touchscreen 310, and the terminal 300 is controlled according to the touch operation. This may further increase a quantity of keys of the terminal 300 and expand a control manner of the terminal 300 with only a need to occupy quite small space and spend quite low costs. Therefore, user experience is improved.

Figure 5:
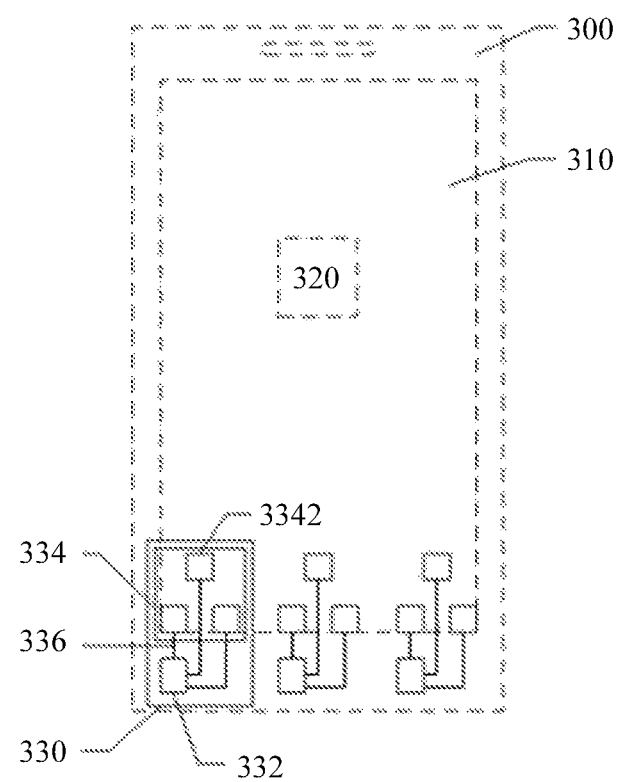
FIG. 5 is a schematic structural diagram of a touch control unit according to another embodiment of the present disclosure.

For further description of the foregoing touch control unit 330 shown in FIG. 4, refer to FIG. 5. FIG. 5 shows a schematic structural diagram of a touch control unit according to another embodiment of the present disclosure. The touch control unit 330 is applied to a terminal 300 including a touchscreen 310 and a controller 320, for example, the terminal 300 may be the terminal 100 shown in FIG. 1 or the terminal 200 shown in FIG. 2, and the touch control unit 330 includes a detection electrode 332, an induction electrode 334, and a conducting wire 336 connecting the detection electrode 332 and the induction electrode 334.

The detection electrode 332 is located outside a touch area of the touchscreen 310 of the terminal 300, the induction electrode 334 is located in the touch area of the touchscreen 310, and the induction electrode 334 is coupled to at least one capacitance node on the touchscreen 310 such that when detecting, according to a capacitance change parameter of the at least one capacitance node and a capacitance change parameter of a node adjacent to the at least one capacitance node, that the detection electrode 332 receives a touch operation, the controller 320 in the terminal 300 generates a touch event used to indicate the touch operation, where the capacitance change parameter indicates a capacitance change value of a corresponding capacitance node during a period of time.

The controller 320 is configured to obtain the capacitance change parameter of the at least one capacitance node and the capacitance change parameter of the node adjacent to the at least one capacitance node, where the capacitance change parameter indicates a capacitance change value of a corresponding capacitance node during a period of time.

The controller 320 is configured to detect, according to the capacitance change parameter of the at least one capacitance node and the capacitance change parameter of the node adjacent to the at least one capacitance node, whether the detection electrode 332 receives a touch operation.

The controller 320 is configured to generate a touch event used to indicate the touch operation when a detection result is that the detection electrode receives the touch operation.

Both the detection electrode 332 and the induction electrode 334 are made of a conducting material. When a user performs a touch operation on the detection electrode 332 outside the touchscreen 310, a charge in the detection electrode 332 is transferred, and therefore a charge in the induction electrode 334 is also transferred accordingly. When the charge in the induction electrode 334 is transferred, a capacitance change value of a capacitance node that is coupled to the induction electrode 334 and that is on the touchscreen 310 is also caused to change. The controller 320 connected to the touchscreen 310 scans capacitance change values of all capacitance nodes on the touchscreen 310, and the controller 320 may determine, according to a capacitance change value of the capacitance node coupled to the induction node 334, a capacitance change value of a capacitance node adjacent to the capacitance node coupled to the induction node 334, and locations of these capacitance nodes, whether capacitance changes of these capacitance nodes are capacitance changes caused by touching the detection electrode 332 by the user or capacitance changes caused by touching the touchscreen 310 by the user when detecting that a capacitance node coupled to an induction node 334 changes. If the controller 320 determines that the capacitance changes of these capacitance nodes are capacitance changes caused by touching the detection electrode 332 by the user, the controller 320 generates a touch event corresponding to a touch operation performed by the user on the detection electrode 332 such that the terminal 300 executes a corresponding control operation according to the touch event.

It should be noted that, the touch control unit 330 may be directly disposed on the touchscreen 310 of the terminal, for example, the touch control unit 330 may be disposed on an upper surface or a lower surface of the touchscreen 310 or inside the touchscreen 310, provided that the induction electrode 334 in the touch control unit 330 is insulated from and coupled to a capacitance node on the touchscreen 310.

Alternatively, the touch control unit 330 may be directly disposed on a screen protector covering an upper surface of the touchscreen 310, for example, the touch control unit 330 may be disposed on an upper surface or a lower surface of the screen protector or inside the screen protector, provided that the induction electrode 334 in the touch control unit 330 is insulated from and coupled to a capacitance node on the touchscreen 310.

The induction electrode 334 includes N induction sub-electrodes 3342, the N induction sub-electrodes 3342 are insulated from each other, capacitance nodes that are separately coupled to the N induction sub-electrodes 3342 are not adjacent to each other, and N is an integer and N≥2.

The controller 320 is configured to detect whether a capacitance change value included in the capacitance change parameter of the at least one capacitance node is greater than a first preset threshold, and detect whether a capacitance change value included in the capacitance change parameter of the node adjacent to the at least one capacitance node is less than or equal to the first preset threshold.

The controller 320 is configured to determine that the detection electrode 332 receives the touch operation when the capacitance change value included in the capacitance change parameter of the at least one capacitance node is greater than the first preset threshold, and the capacitance change value included in the capacitance change parameter of the node adjacent to the at least one capacitance node is less than or equal to the first preset threshold.

The detection electrode 332 is a single electrode, and the N induction sub-electrodes 3342 are separately connected to the detection electrode 332 using the conducting wire 336.

For example, when detecting that a capacitance change value of a capacitance node coupled to the induction electrode is relatively large, and that a capacitance change value of another node adjacent to the capacitance node is relatively small, the controller 320 may consider that a capacitance change of the capacitance node coupled to the induction electrode 334 is caused by a charge transfer in the induction electrode 334, and therefore can determine that the detection electrode 332 connected to the induction electrode 334 receives a touch operation of the user.

In an actual application, when the user performs a touch operation on the touchscreen 310, and a touch area only includes a capacitance node coupled to the induction electrode 334, the controller 320 may incorrectly consider that the detection electrode 332 receives a user operation, thereby causing erroneous detection. For the purpose of reducing a possibility of erroneous detection of the controller 320 and further improving detection accuracy, the induction electrode 334 may be divided into N parts, where each part is separately connected to the same detection electrode 332 using a conducting wire 336, all the parts are separately coupled to different capacitance nodes, and these capacitance nodes are not adjacent to each other. When detecting that capacitance change values of the capacitance nodes coupled to the N parts of the induction electrode meet a condition, and that capacitance change values of other capacitance nodes adjacent to these capacitance nodes do not meet the condition, the controller 320 can determine that capacitance changes of the capacitance nodes coupled to the N parts of the induction electrode 334 are capacitance changes caused by a touch operation performed on the detection electrode 332 by the user, instead of being caused by a touch operation performed on these capacitance nodes on the touchscreen 310 by the user.

Referring to a schematic diagram of a capacitance change value shown in FIG. 3, the induction electrode 334 includes three induction sub-electrodes 3342, and a first preset value set by the terminal is 20. After acquiring capacitance change values of all capacitance nodes, the controller 320 detects that all capacitance change values of capacitance nodes separately coupled to the three induction sub-electrodes 3342 exceed 20, and that none of capacitance change values of other capacitance nodes adjacent to these three capacitance nodes exceeds 20, and therefore can determine that the user performs a touch operation on the detection electrode 332 corresponding to the induction electrode 334.

Further, when the detection electrode 332 receives a touch operation, capacitance change parameters of capacitance nodes separately corresponding to the N induction sub-electrodes 3342 are in a preset proportion.

The controller 320 is configured to detect whether capacitance change values included in capacitance change parameters of the capacitance nodes that are separately coupled to the N induction sub-electrodes 3342 are in a preset proportion before determining that the detection electrode 332 receives the touch operation, and determine that the detection electrode 332 receives the touch operation when the capacitance change values included in the capacitance change parameters of the capacitance nodes that are separately coupled to the N induction sub-electrodes 3342 are in the preset proportion.

A capacitance change value that is of a capacitance node and that is caused by the induction electrode 334 is determined by area sizes of the induction electrode 334 and the detection electrode 332 and impedance between the induction electrode 334 and the detection electrode 332. When the touch control unit 330 is being set, area sizes of all the induction sub-electrodes 3342 and the detection electrode 332 that are in the touch control unit 330 and impedance of the conducting wire 336 may be set to fixed values such that when the user performs a touch operation on the detection electrode 332, capacitance change values of capacitance nodes coupled to all the induction sub-electrodes 3342 accord with a predetermined proportion. Therefore, detection accuracy is further improved.

Referring to the schematic diagram of a capacitance change value shown in FIG. 3, after acquiring the capacitance change values of all the capacitance nodes, the controller 320 detects that the capacitance change values of the capacitance nodes separately coupled to the three induction sub-electrodes 3342 are separately 50, 45, and 40, which accords with a preset proportion 10:9:8, and that none of the capacitance change values of the other capacitance nodes adjacent to these three capacitance nodes exceeds 20, and therefore can determine that the user performs a touch operation on the detection electrode 332 corresponding to the induction electrode 334.

Optionally, when the detection electrode 332 receives a touch operation, the capacitance change value of the at least one capacitance node accords with a predetermined value, where the predetermined value is different from a capacitance change value of the at least one capacitance node when the at least one capacitance node receives a touch operation.

A capacitance change value of a capacitance node is relatively fixed when the user uses a finger to perform a touch operation on the touchscreen 310, and the area sizes of all the induction sub-electrodes 3342 and the detection electrode 332 that are in the touch control unit 330 and the impedance of the conducting wire 336 may be set to fixed values. Therefore, when the user performs a touch operation on the detection electrode 332, a capacitance change value of a capacitance node coupled to the induction electrode 334 is different from a capacitance change value of the capacitance node when the user performs a touch operation on the touch area on the touchscreen 310, thereby achieving an effect of distinguishing between an operation performed on the touch area by the user and an operation performed on the detection electrode 332 by the user.

For example, if a capacitance change value of a capacitance node is 100 when the user uses a finger to perform a touch operation on the touchscreen 310, the area sizes of all the induction sub-electrodes 3342 and the detection electrode 332 that are in the touch control unit 330 and the impedance of the conducting wire 336 may be set to fixed values such that when the user performs a touch operation on the detection electrode 332, a capacitance change value of a capacitance node coupled to the induction electrode 334 is 50. When detecting that the capacitance change value of the capacitance node coupled to the induction electrode 334 is approximately 50, and that a capacitance change value of an adjacent capacitance node is below 20, the controller 320 can determine that the user performs a touch operation on the detection electrode 332.

In conclusion, according to the touch control unit 330 provided in this embodiment of the present disclosure, a detection electrode 332 is disposed outside a touch area of a touchscreen 310 of a terminal 300, an induction electrode 334 is disposed in the touch area, and the detection electrode 332 and the induction electrode 334 are connected using a conducting wire 336. When a user operates the detection electrode 332, a capacitance change value of a capacitance node coupled to the induction electrode 334 is caused to change such that a controller 320 can detect, according to a capacitance change of the capacitance node coupled to the induction electrode 334, whether the detection electrode 332 receives a touch operation, and generate a corresponding touch event when detecting that the detection electrode 332 receives the touch operation. An existing capacitance node on the touchscreen 310 identifies a touch operation performed by the user on the detection electrode 332 disposed outside the touchscreen 310, and the terminal 300 is controlled according to the touch operation. This may further increase a quantity of keys of the terminal 300 and expand a control manner of the terminal 300 with only a need to occupy quite small space and spend quite low costs. Therefore, user experience is improved.

Further, according to the touch control unit 330 provided in this embodiment of the present disclosure, the induction electrode 334 is divided into N induction sub-electrodes 3342, where the N induction sub-electrodes 3342 are insulated from each other, and capacitance nodes that are separately coupled to the N induction sub-electrodes 3342 are not adjacent to each other. When detecting that capacitance change values of all capacitance nodes corresponding to the N induction sub-electrodes 3342 meet a condition, and that capacitance change values of other adjacent capacitance nodes do not meet the condition, the controller 320 determines that the user performs a touch operation on the detection electrode 332. Therefore, a misoperation is reduced, and detection accuracy is further improved.

In addition, according to the touch control unit 330 provided in this embodiment of the present disclosure, when the detection electrode 332 receives a touch operation, the capacitance change values of the capacitance nodes separately corresponding to the N induction sub-electrodes 3342 are set to be in a preset proportion. Therefore, a misoperation is reduced, and the detection accuracy is further improved.

Figure 6:
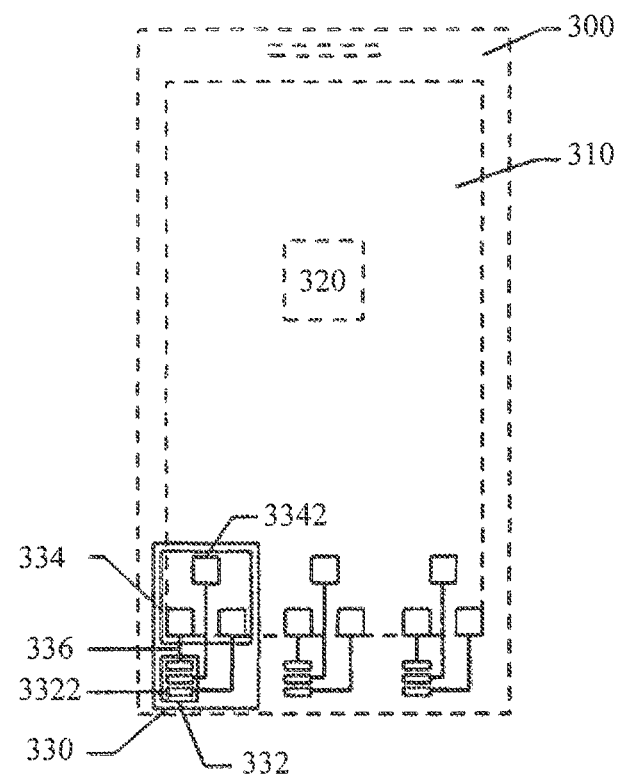
FIG. 6 is a schematic structural diagram of a touch control unit according to still another embodiment of the present disclosure.

For further description of the foregoing touch control unit shown 330 in FIG. 4, refer to FIG. 6. FIG. 6 shows a schematic structural diagram of a touch control unit according to still another embodiment of the present disclosure. The touch control unit 330 is applied to a terminal 300 including a touchscreen 310 and a controller 320, for example, the terminal 300 may be the terminal 100 shown in FIG. 1 or the terminal 200 shown in FIG. 2, and the touch control unit 330 includes a detection electrode 332, an induction electrode 334, and a conducting wire 336 connecting the detection electrode 332 and the induction electrode 334.

The detection electrode 332 is located outside a touch area of the touchscreen 310 of the terminal 300, the induction electrode 334 is located in the touch area of the touchscreen 310, and the induction electrode 334 is coupled to at least one capacitance node on the touchscreen 310 such that when detecting, according to a capacitance change parameter of the at least one capacitance node and a capacitance change parameter of a node adjacent to the at least one capacitance node, that the detection electrode 332 receives a touch operation, the controller 320 in the terminal 300 generates a touch event used to indicate the touch operation, where the capacitance change parameter indicates a capacitance change value of a corresponding capacitance node during a period of time.

The controller 320 is configured to obtain the capacitance change parameter of the at least one capacitance node and the capacitance change parameter of the node adjacent to the at least one capacitance node, where the capacitance change parameter indicates a capacitance change value of a corresponding capacitance node during a period of time.

The controller 320 is configured to detect, according to the capacitance change parameter of the at least one capacitance node and the capacitance change parameter of the node adjacent to the at least one capacitance node, whether the detection electrode 332 receives a touch operation.

The controller 320 is configured to generate a touch event used to indicate the touch operation when a detection result is that the detection electrode 332 receives the touch operation.

Both the detection electrode 332 and the induction electrode 334 are made of a conducting material. When a user performs a touch operation on the detection electrode 332 outside the touchscreen 310, a charge in the detection electrode 332 is transferred, and therefore a charge in the induction electrode 334 is also transferred accordingly. When the charge in the induction electrode 334 is transferred, a capacitance change value of a capacitance node that is coupled to the induction electrode 334 and that is on the touchscreen 310 is also caused to change. The controller 320 connected to the touchscreen 310 scans capacitance change values of all capacitance nodes on the touchscreen 310, and when detecting that a capacitance node coupled to an induction node changes, the controller 320 may determine, according to a capacitance change value of the capacitance node coupled to the induction node, a capacitance change value of a capacitance node adjacent to the capacitance node coupled to the induction node, and locations of these capacitance nodes, whether capacitance changes of these capacitance nodes are capacitance changes caused by touching the detection electrode 332 by the user or capacitance changes caused by touching the touchscreen 310 by the user. If the controller 320 determines that the capacitance changes of these capacitance nodes are capacitance changes caused by touching the detection electrode 332 by the user, the controller 320 generates a touch event corresponding to a touch operation performed by the user on the detection electrode 332 such that the terminal 300 executes a corresponding control operation according to the touch event.

It should be noted that, the touch control unit 330 may be directly disposed on the touchscreen 310 of the terminal 300, for example, the touch control unit 330 may be disposed on an upper surface or a lower surface of the touchscreen 310 or inside the touchscreen 310, provided that the induction electrode 334 in the touch control unit 330 is insulated from and coupled to a capacitance node on the touchscreen 310.

Alternatively, the touch control unit 330 may be directly disposed on a screen protector covering an upper surface of the touchscreen 310, for example, the touch control unit 330 may be disposed on an upper surface or a lower surface of the screen protector or inside the screen protector, provided that the induction electrode 334 in the touch control unit 330 is insulated from and coupled to a capacitance node on the touchscreen 310.

The induction electrode 334 includes N induction sub-electrodes 3342, the N induction sub-electrodes 3342 are insulated from each other, capacitance nodes that are separately coupled to the N induction sub-electrodes 3342 are not adjacent to each other, and N is an integer and $N \geq 2$.

The controller 320 is configured to detect whether a capacitance change value included in the capacitance change parameter of the at least one capacitance node is greater than a first preset threshold, and detect whether a capacitance change value included in the capacitance change parameter of the node adjacent to the at least one capacitance node is less than or equal to the first preset threshold.

The controller 320 is configured to determine that the detection electrode 332 receives the touch operation when the capacitance change value included in the capacitance change parameter of the at least one capacitance node is greater than the first preset threshold, and the capacitance change value included in the capacitance change parameter of the node adjacent to the at least one capacitance node is less than or equal to the first preset threshold.

For example, when detecting that a capacitance change value of a capacitance node coupled to the induction electrode 334 is relatively large, and that a capacitance change value of another node adjacent to the capacitance node is relatively small, the controller 320 may consider that a capacitance change of the capacitance node coupled to the induction electrode 334 is caused by a charge transfer in the induction electrode 334, and therefore can determine that the detection electrode 332 connected to the induction electrode 334 receives a touch operation of the user.

In an actual application, when the user performs a touch operation on the touchscreen 310, and a touch area only includes a capacitance node coupled to the induction electrode 334, the controller 320 may incorrectly consider that the detection electrode 332 receives a user operation, thereby causing erroneous detection. For the purpose of reducing a possibility of erroneous detection of the controller 320 and further improving detection accuracy, the induction electrode 334 may be divided into N parts, where all the parts are coupled to different capacitance nodes, and these capacitance nodes are not adjacent to each other. When detecting that capacitance change values of the capacitance nodes coupled to the N parts of the induction electrode 334 meet a condition, and that capacitance change values of other capacitance nodes adjacent to these capacitance nodes do not meet the condition, the controller 320 can determine that capacitance changes of the capacitance nodes coupled to the N parts of the induction electrode 334 are capacitance changes caused by a touch operation performed on the detection electrode 332 by the user, instead of being caused by a touch operation performed on these capacitance nodes on the touchscreen 310 by the user.

Referring to a schematic diagram of a capacitance change value shown in FIG. 3, the induction electrode 334 includes three induction sub-electrodes 3342, and a first preset value set by the terminal is 20. After acquiring capacitance change values of all capacitance nodes, the controller 320 detects that all capacitance change values of capacitance nodes separately coupled to the three induction sub-electrodes 3342 exceed 20, and that none of capacitance change values of other capacitance nodes adjacent to these three capacitance nodes exceeds 20, and therefore can determine that the user performs a touch operation on the detection electrode 332 corresponding to the induction electrode 334.

Further, when the detection electrode 332 receives a touch operation, capacitance change parameters of capacitance nodes separately corresponding to the N induction sub-electrodes 3342 are in a preset proportion.

The controller 320 is configured to detect whether capacitance change values included in capacitance change parameters of the capacitance nodes that are separately coupled to the N induction sub-electrodes 3342 are in a preset proportion before determining that the detection electrode 332 receives the touch operation, and determine that the detection electrode 332 receives the touch operation when the capacitance change values included in the capacitance change parameters of the capacitance nodes that are separately coupled to the N induction sub-electrodes 3342 are in the preset proportion.

A capacitance change value that is of a capacitance node and that is caused by the induction electrode 334 is determined by area sizes of the induction electrode 334 and the detection electrode 332 and impedance between the induction electrode 334 and the detection electrode 334. When the touch control unit 330 is being set, area sizes of all the induction sub-electrodes 3342 and the detection electrode 332 that are in the touch control unit 330 and impedance of the conducting wire 336 may be set to fixed values such that when the user performs a touch operation on the detection electrode 332, capacitance change values of capacitance nodes coupled to all the induction sub-electrodes 3342 accord with a predetermined proportion. Therefore, detection accuracy is further improved.

Referring to the schematic diagram of a capacitance change value shown in FIG. 3, after acquiring the capacitance change values of all the capacitance nodes, the controller 320 detects that the capacitance change values of the capacitance nodes separately coupled to the three induction sub-electrodes 3342 are separately 50, 45, and 40, which accords with a preset proportion 10:9:8, and that none of the capacitance change values of the other capacitance nodes adjacent to these three capacitance nodes exceeds 20, and therefore can determine that the user performs a touch operation on the detection electrode 332 corresponding to the induction electrode 334.

Further, the detection electrode 332 includes N detection sub-electrodes 3322, where the N detection sub-electrodes 3322 are insulated from each other, and the N detection sub-electrodes 3322 are connected to the N induction sub-electrodes 3342 in a one-to-one correspondence manner using the conducting wire 336.

In FIG. 6, when the user performs a touch operation on the touchscreen 310, and a capacitance change value of a capacitance node coupled to an induction sub-electrode 3342 is caused to change, a charge of the induction sub-electrode 3342 is also transferred accordingly under a coupling effect. If all induction sub-electrodes 3342 are connected to the same detection electrode 332, charges of other induction sub-electrodes 3342 are transferred therewith, which causes capacitance change values of capacitance nodes coupled to all the other induction sub-electrodes 3342 to change, thereby causing erroneous detection. For the purpose of avoiding this situation, the detection electrode 332 may also be disposed as N detection sub-electrodes 3322 that are insulated from each other, where each detection sub-electrode 3322 is correspondingly connected to one induction sub-electrode 3342 such that even though a charge of an induction sub-electrode 3342 is transferred due to a touch operation performed on the touchscreen 310 by the user, a charge in another induction sub-electrode 3342 in the touch control unit 330 is not changed. Therefore, occurrence of an erroneous detection situation is avoided, and detection accuracy is further improved.

It should be noted that a size of the detection electrode 332 that includes the N detection sub-electrodes 3322 should be small enough such that the touch area can cover all the N detection sub-electrodes 3322 when the user performs a touch operation on the detection electrode 332.

In an actual application, a quantity of detection sub-electrodes 3322 and a quantity of induction sub-electrodes 3342 do not need to be strictly equal. For example, the quantity of detection sub-electrodes 3322 may be set to be less than the quantity of induction sub-electrodes 3342, where one detection sub-electrode 3322 may be correspondingly connected to multiple induction sub-electrodes 3342, or the quantity of detection sub-electrodes 3322 may be set to be greater than the quantity of induction sub-electrodes 3342, where multiple detection sub-electrodes 3322 are correspondingly connected to one induction sub-electrode 3342, or multiple detection sub-electrodes 3322 may be set to be cross-connected to multiple induction sub-electrodes 3342.

Further, an area of each induction sub-electrode 3342 does not exceed an area of two capacitance nodes.

A size of one capacitance node on the touchscreen 310 is relatively small relative to a finger of a person. Therefore, when the user performs a touch operation on the touchscreen 310, a contact area of a user's finger on the touchscreen 310 is relatively large, which is generally accompanied by changes of capacitance change values of multiple adjacent capacitance nodes. Therefore, for the purpose of reducing erroneous detection, an area of an induction sub-electrode 3342 may be set as small as possible such that capacitance nodes affected by each induction sub-electrode 3342 are as few as possible. Preferentially, an area of an induction sub-electrode 3342 may be set to be less than an area of two capacitance nodes.

Further, a width of a part that is of the conducting wire 336 and that passes through a capacitance node on the touchscreen 310≤1 mm.

In this embodiment of the present disclosure, when the user performs a touch operation on the detection electrode 332, a charge transfer also occurs on the conducting wire 336. If a width of the conducting wire is relatively large, a capacitance node through which the conducting wire 336 passes may be affected, which causes a change of a capacitance change value of the capacitance node. For the purpose of preventing the conducting wire 336 from affecting a capacitance node on the touchscreen 310, the induction electrode 334 may be disposed on an edge of the touch area. Alternatively, if the induction electrode 334 is disposed on a non-edge location of the touch area, the width of the part that is of the conducting wire 336 and that passes through a capacitance node may be set as small as possible. Preferentially, the width of this part of the conducting wire 336 may be set to be less than 1 mm.

Optionally, when the detection electrode 332 receives a touch operation, the capacitance change value of the at least one capacitance node accords with a predetermined value, where the predetermined value is different from a capacitance change value of the at least one capacitance node when the at least one capacitance node receives a touch operation.

A capacitance change value of a capacitance node is relatively fixed when the user uses a finger to perform a touch operation on the touchscreen 310, and the area sizes of all the induction sub-electrodes 3342 and the detection electrode 332 that are in the touch control unit 330 and the impedance of the conducting wire 336 may be set to fixed values. Therefore, when the user performs a touch operation on the detection electrode 332, a capacitance change value of a capacitance node coupled to the induction electrode 334 is different from a capacitance change value of the capacitance node when the user performs a touch operation on the touch area on the touchscreen 310, thereby achieving an effect of distinguishing between an operation performed on the touch area by the user and an operation performed on the detection electrode 332 by the user.

For example, if a capacitance change value of a capacitance node is 100 when the user uses a finger to perform a touch operation on the touchscreen 310, the area sizes of all the induction sub-electrodes 3342 and the detection electrode 332 that are in the touch control unit 330 and the impedance of the conducting wire 336 may be set to fixed values such that when the user performs a touch operation on the detection electrode 332, a capacitance change value of a capacitance node coupled to the induction electrode 334 is 50. When detecting that the capacitance change value of the capacitance node coupled to the induction electrode 334 is approximately 50, and that a capacitance change value of an adjacent capacitance node is below 20, the controller 320 can determine that the user performs a touch operation on the detection electrode 332.

In conclusion, according to the touch control unit 330 provided in this embodiment of the present disclosure, a detection electrode 332 is disposed outside a touch area of a touchscreen 310 of a terminal 300, an induction electrode 334 is disposed in the touch area, and the detection electrode 332 and the induction electrode 334 are connected using a conducting wire 336. When a user operates the detection electrode 332, a capacitance change value of a capacitance node coupled to the induction electrode 334 is caused to change such that a controller 320 can detect, according to a capacitance change of the capacitance node coupled to the induction electrode 334, whether the detection electrode 332 receives a touch operation, and generate a corresponding touch event when detecting that the detection electrode 332 receives the touch operation. An existing capacitance node on the touchscreen 310 identifies a touch operation performed by the user on the detection electrode 332 disposed outside the touchscreen 310, and the terminal 300 is controlled according to the touch operation. This may further increase a quantity of keys of the terminal 300 and expand a control manner of the terminal 300 with only a need to occupy quite small space and spend quite low costs. Therefore, user experience is improved.

Further, according to the touch control unit 330 provided in this embodiment of the present disclosure, the induction electrode 334 is divided into N induction sub-electrodes 3342, where the N induction sub-electrodes 3342 are insulated from each other, and capacitance nodes that are separately coupled to the N induction sub-electrodes 3342 are not adjacent to each other. When detecting that capacitance change values of all capacitance nodes corresponding to the N induction sub-electrodes 3342 meet a condition, and that capacitance change values of other adjacent capacitance nodes do not meet the condition, the controller 320 determines that the user performs a touch operation on the detection electrode 332. Therefore, a misoperation is reduced, and detection accuracy is further improved.

In addition, according to the touch control unit 330 provided in this embodiment of the present disclosure, when the detection electrode 332 receives a touch operation, the capacitance change values of the capacitance nodes separately corresponding to the N induction sub-electrodes 3342 are set to be in a preset proportion. Therefore, a misoperation is reduced, and the detection accuracy is further improved.

In addition, according to the touch control unit 330 provided in this embodiment of the present disclosure, the detection electrode 332 includes N detection sub-electrodes 3322, where the N detection sub-electrodes 3322 are insulated from each other, and the N detection sub-electrodes 3322 are connected to the N induction sub-electrodes 3342 in a one-to-one correspondence manner using the conducting wire 336, which prevents another induction sub-electrode 3342 from being affected when a charge transfer occurs in one of the N induction sub-electrodes 3342 under a coupling effect of a capacitance node. Therefore, a possibility of erroneous detection is reduced, and the detection accuracy is further improved.

Finally, according to the touch control unit 330 provided in this embodiment of the present disclosure, an area of an induction sub-electrode 3342 does not exceed an area of two capacitance nodes, and when the induction electrode 334 is located on a non-edge location of the touch area of the touchscreen 310, a width of the conducting wire 336 is set to be less than or equal to 1 mm. Therefore, the possibility of erroneous detection is further reduced, and the detection accuracy is improved.

Figure 7:
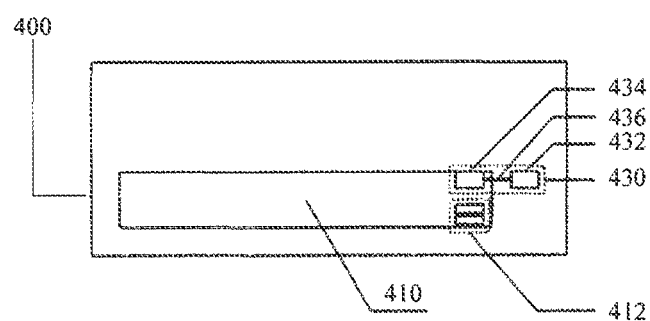
FIG. 7 is a schematic structural diagram of a touchscreen according to an embodiment of the present disclosure.

Referring to FIG. 7, FIG. 7 shows a schematic structural diagram of a touchscreen 410 included in a terminal 400, according to an embodiment of the present disclosure. The touchscreen 410 may be applied to the terminal 100 shown in FIG. 1 or the terminal 200 shown in FIG. 2, and the touchscreen 410 includes at least one touch control unit 430.

The touch control unit 430 is similar to the touch control unit 330 shown in any one of FIG. 4 to FIG. 6.

As shown in FIG. 7, the touch control unit 430 includes a detection electrode 432, an induction electrode 434, and a conducting wire 436. The touch control unit 430 may be directly disposed on an upper surface of the touchscreen 410. In an actual application, the touch control unit 430 may also be disposed on a lower surface of the touchscreen 410 or inside the touchscreen 410, provided that the induction electrode 434 in the touch control unit 430 is insulated from and coupled to a capacitance node 412 on the touchscreen 410.

In conclusion, according to the touchscreen 410 provided in this embodiment of the present disclosure, a detection electrode 432 is disposed outside a touch area of the touchscreen 410, an induction electrode 434 is disposed in the touch area, and the detection electrode 432 and the induction electrode 434 are connected using a conducting wire 436. When a user operates the detection electrode 432, a capacitance change value of a capacitance node 412 coupled to the induction electrode 434 is caused to change such that a controller (not shown) can detect, according to a capacitance change of the capacitance node 412 coupled to the induction electrode 434, whether the detection electrode 432 receives a touch operation, and generate a corresponding touch event when detecting that the detection electrode 432 receives the touch operation. An existing capacitance node 412 on the touchscreen 410 identifies a touch operation performed by the user on the detection electrode 432 disposed outside the touchscreen 410, and a terminal 400 is controlled according to the touch operation. This may further increase a quantity of keys of the terminal 400 and expand a control manner of the terminal 400 with only a need to occupy quite small space and spend quite low costs. Therefore, user experience is improved.

Further, according to the touchscreen 410 provided in this embodiment of the present disclosure, the induction electrode 432 is divided into N induction sub-electrodes (not shown), where the N induction sub-electrodes are insulated from each other, and capacitance nodes 412 that are separately coupled to the N induction sub-electrodes are not adjacent to each other. When detecting that capacitance change values of all capacitance nodes 412 corresponding to the N induction sub-electrodes meet a condition, and that capacitance change values of other adjacent capacitance nodes 412 do not meet the condition, the controller determines that the user performs a touch operation on the detection electrode 432. Therefore, a possibility of erroneous detection is reduced, and detection accuracy is further improved.

In addition, according to the touchscreen 410 provided in this embodiment of the present disclosure, when the detection electrode 432 receives a touch operation, the capacitance change values of the capacitance nodes 412 separately corresponding to the N induction sub-electrodes are set to be in a preset proportion. Therefore, the possibility of erroneous detection is reduced, and the detection accuracy is further improved.

In addition, according to the touchscreen 410 provided in this embodiment of the present disclosure, the detection electrode 432 includes N detection sub-electrodes (not shown), where the N detection sub-electrodes are insulated from each other, and the N detection sub-electrodes are connected to the N induction sub-electrodes in a one-to-one correspondence manner using the conducting wire, which prevents another induction sub-electrode from being affected when a charge transfer occurs in one of the N induction sub-electrodes under a coupling effect of a capacitance node 412. Therefore, the possibility of erroneous detection is reduced, and the detection accuracy is further improved.

Finally, according to the touchscreen 410 provided in this embodiment of the present disclosure, an area of an induction sub-electrode does not exceed an area of two capacitance nodes 412, and when the induction electrode is located on a non-edge location of the touch area of the touchscreen 410, a width of the conducting wire 436 is set to be less than or equal to 1 mm. Therefore, the possibility of erroneous detection is further reduced, and the detection accuracy is improved.

Figure 8:
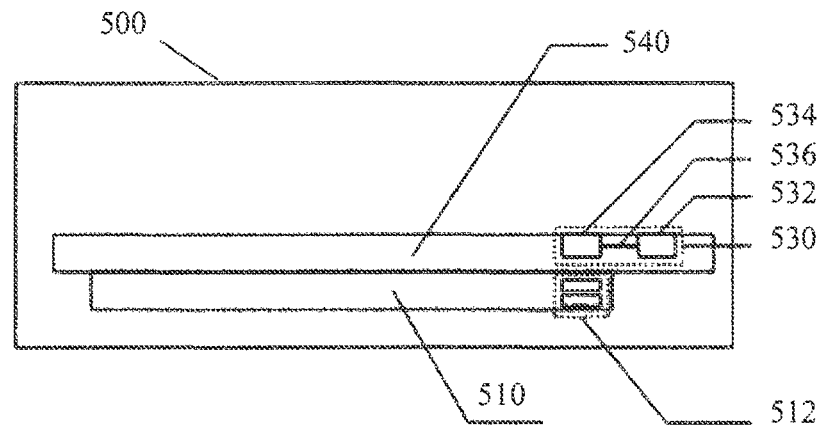
FIG. 8 is a schematic structural diagram of a screen protector according to an embodiment of the present disclosure.

Referring to FIG. 8, FIG. 8 shows a schematic structural diagram of a screen protector 540 implemented in a terminal 500, according to an embodiment of the present disclosure. The terminal 500 further includes a touchscreen 510, and the screen protector 540 includes at least one touch control unit 530.

The touch control unit 530 is similar to the touch control unit 330 shown in any one of FIG. 4 to FIG. 6.

As shown in FIG. 8, the touch control unit 530 includes a detection electrode 532, an induction electrode 534, and a conducting wire 536. The touch control unit 530 may be directly disposed on an upper surface of the screen protector 540. In an actual application, the touch control unit 530 may also be disposed on a lower surface of the screen protector 540 or inside the screen protector 540, provided that the induction electrode 534 in the touch control unit 530 is insulated from and coupled to a capacitance node 512 on the touchscreen 510 of the terminal 500.

In conclusion, according to the screen protector 540 provided in this embodiment of the present disclosure, a detection electrode 532 is disposed outside a touch area of a touchscreen 510 of a terminal 500, an induction electrode 534 is disposed in the touch area, and the detection electrode 532 and the induction electrode 534 are connected using a conducting wire 536. When a user operates the detection electrode 532, a capacitance change value of a capacitance node 512 coupled to the induction electrode 534 is caused to change such that a controller (not shown) can detect, according to a capacitance change of the capacitance node 512 coupled to the induction electrode 534, whether the detection electrode 532 receives a touch operation, and generate a corresponding touch event when detecting that the detection electrode 532 receives the touch operation. An existing capacitance node 512 on the touchscreen 510 identifies a touch operation performed by the user on the detection electrode 532 disposed outside the touchscreen 510, and the terminal 500 is controlled according to the touch operation. This may further increase a quantity of keys of the terminal 500 and expand a control manner of the terminal 500 with only a need to occupy quite small space and spend quite low costs. Therefore, user experience is improved.

Further, according to the screen protector 540 provided in this embodiment of the present disclosure, the induction electrode 534 is divided into N induction sub-electrodes (not shown), where the N induction sub-electrodes are insulated from each other, and capacitance nodes 512 that are separately coupled to the N induction sub-electrodes are not adjacent to each other. When detecting that capacitance change values of all capacitance nodes 512 corresponding to the N induction sub-electrodes meet a condition, and that capacitance change values of other adjacent capacitance nodes 512 do not meet the condition, the controller determines that the user performs a touch operation on the detection electrode 532. Therefore, a possibility of erroneous detection is reduced, and detection accuracy is further improved.

In addition, according to the screen protector 540 provided in this embodiment of the present disclosure, when the detection electrode 532 receives a touch operation, the capacitance change values of the capacitance nodes 512 separately corresponding to the N induction sub-electrodes are set to be in a preset proportion. Therefore, the possibility of erroneous detection is reduced, and the detection accuracy is further improved.

In addition, according to the screen protector 540 provided in this embodiment of the present disclosure, the detection electrode 532 includes N detection sub-electrodes (not shown), where the N detection sub-electrodes are insulated from each other, and the N detection sub-electrodes are connected to the N induction sub-electrodes in a one-to-one correspondence manner using the conducting wire 536, which prevents another induction sub-electrode from being affected when a charge transfer occurs in one of the N induction sub-electrodes under a coupling effect of a capacitance node. Therefore, the possibility of erroneous detection is reduced, and the detection accuracy is further improved.

Finally, according to the screen protector 540 provided in this embodiment of the present disclosure, an area of an induction sub-electrode does not exceed an area of two capacitance nodes 512, and when the induction electrode is located on a non-edge location of the touch area of the touchscreen, a width of the conducting wire 536 is set to be less than or equal to 1 mm. Therefore, the possibility of erroneous detection is further reduced, and the detection accuracy is improved.

Figure 9:
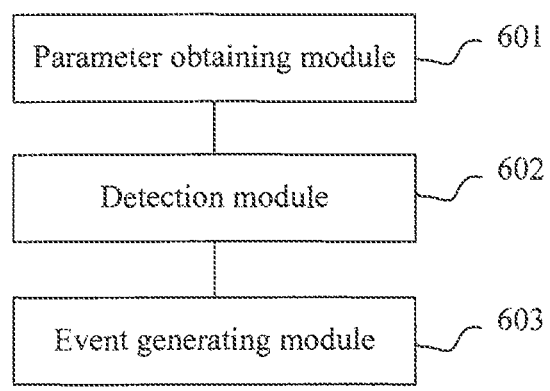
FIG. 9 is an apparatus structure diagram of an operation detection apparatus according to an embodiment of the present disclosure.

Referring to FIG. 9, FIG. 9 shows an apparatus structure diagram of an operation detection apparatus according to an embodiment of the present disclosure. The operation detection apparatus may be applied to a terminal including a touchscreen, a controller connected to the touchscreen, and at least one touch control unit, where the touch control unit includes a detection electrode, an induction electrode, and a conducting wire connecting the detection electrode and the induction electrode. The detection electrode is located outside a touch area of the touchscreen, the induction electrode is located in the touch area of the touchscreen, and the induction electrode is coupled to at least one capacitance node on the touchscreen. The operation detection apparatus may include a parameter acquiring module 601 configured to obtain a capacitance change parameter of the at least one capacitance node and a capacitance change parameter of a node adjacent to the at least one capacitance node, where the capacitance change parameter indicates a capacitance change value of a corresponding capacitance node during a period of time, a detection module 602 configured to detect, according to the capacitance change parameter of the at least one capacitance node and the capacitance change parameter of the node adjacent to the at least one capacitance node, whether the detection electrode receives a touch operation, and an event generating module 603 configured to generate a touch event used to indicate the touch operation when a detection result is that the detection electrode receives the touch operation.

In conclusion, according to the operation detection apparatus provided in this embodiment of the present disclosure, a corresponding touch event is generated when it is detected, according to a capacitance change of a capacitance node coupled to an induction electrode disposed in a touch area of a touchscreen and a capacitance change of a capacitance node adjacent to the capacitance node, that a detection electrode disposed outside the touch area of the touchscreen receives a touch operation. An existing capacitance node on the touchscreen identifies a touch operation performed by a user on the detection electrode disposed outside the touchscreen, and a terminal is controlled according to the touch operation. This may further increase a quantity of keys of the terminal and expand a control manner of the terminal with only a need to occupy quite small space and spend quite low costs. Therefore, user experience is improved.

Figure 10:
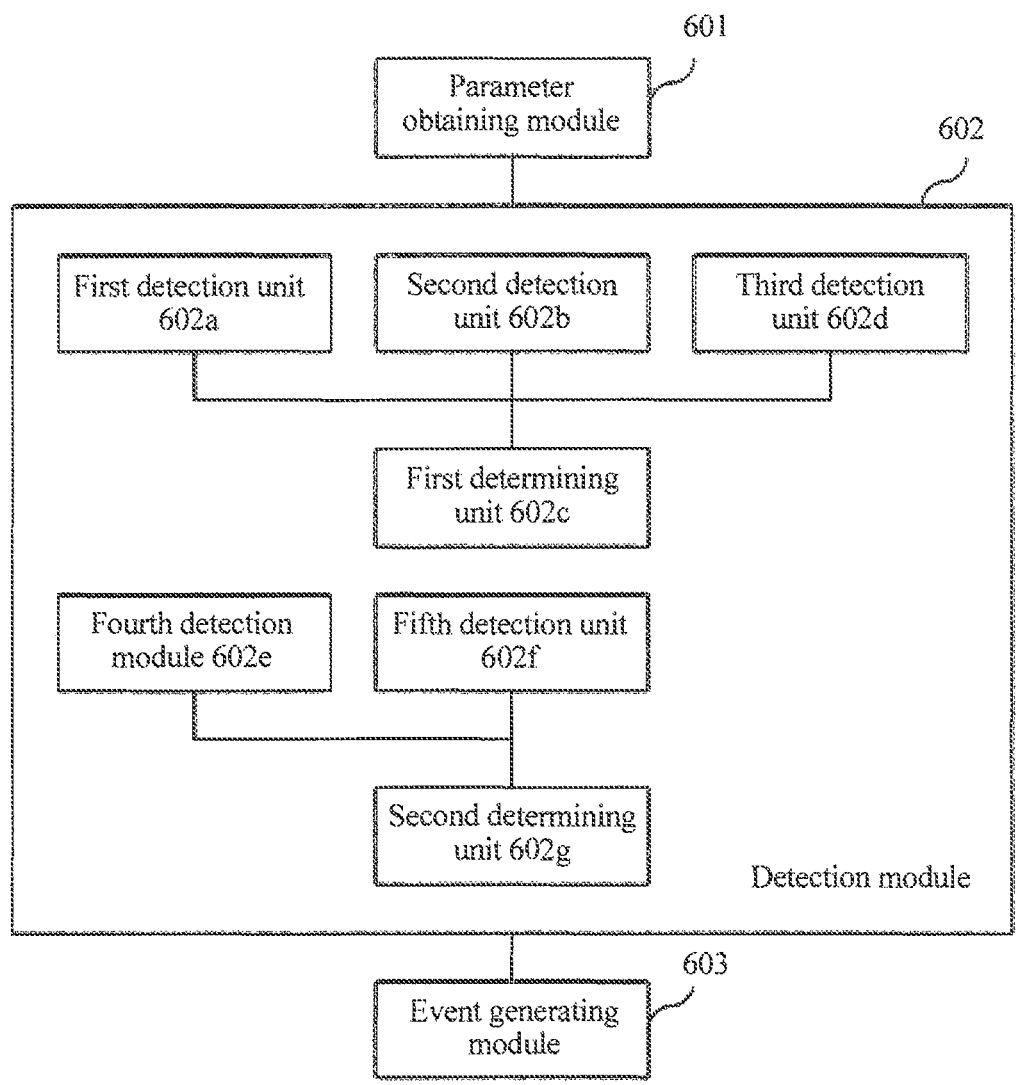
FIG. 10 is an apparatus structure diagram of an operation detection apparatus according to another embodiment of the present disclosure.

For further description of the foregoing embodiment corresponding to FIG. 9, refer to FIG. 10. FIG. 10 shows an apparatus structure diagram of an operation detection apparatus according to another embodiment of the present disclosure. The operation detection apparatus may be applied to a terminal including a touchscreen, a controller connected to the touchscreen, and at least one touch control unit, where the touch control unit includes a detection electrode, an induction electrode, and a conducting wire connecting the detection electrode and the induction electrode. The detection electrode is located outside a touch area of the touchscreen, the induction electrode is located in the touch area of the touchscreen, and the induction electrode is coupled to at least one capacitance node on the touchscreen. The operation detection apparatus may include a parameter acquiring module 601 configured to obtain a capacitance change parameter of the at least one capacitance node and a capacitance change parameter of a node adjacent to the at least one capacitance node, where the capacitance change parameter indicates a capacitance change value of a corresponding capacitance node during a period of time, a detection module 602 configured to detect, according to the capacitance change parameter of the at least one capacitance node and the capacitance change parameter of the node adjacent to the at least one capacitance node, whether the detection electrode receives a touch operation, and an event generating module 603 configured to generate a touch event used to indicate the touch operation when a detection result is that the detection electrode receives the touch operation.

Optionally, the detection module 602 includes a first detection unit 602a configured to detect whether a capacitance change value included in the capacitance change parameter of the at least one capacitance node is greater than a first preset threshold, a second detection unit 602b configured to detect whether a capacitance change value included in the capacitance change parameter of the node adjacent to the at least one capacitance node is less than or equal to the first preset threshold, and a first determining unit 602c configured to determine that the detection electrode receives the touch operation when the capacitance change value included in the capacitance change parameter of the at least one capacitance node is greater than the first preset threshold, and the capacitance change value included in the capacitance change parameter of the node adjacent to the at least one capacitance node is less than or equal to the first preset threshold.

The detection module 602 further includes a third detection unit 602d configured to detect whether capacitance change values included in capacitance change parameters of capacitance nodes that are separately coupled to N induction sub-electrodes are in a preset proportion before the first determining unit 602c determines that the detection electrode receives the touch operation, and the first determining unit 602c is configured to execute the step of determining that the detection electrode receives the touch operation when the capacitance change values included in the capacitance change parameters of the capacitance nodes that are separately coupled to the N induction sub-electrodes are in the preset proportion, where the induction electrode includes the N induction sub-electrodes, the N induction sub-electrodes are insulated from each other, the capacitance nodes that are separately coupled to the N induction sub-electrodes are not adjacent to each other, and N≥2.

Optionally, the detection module 602 includes a fourth detection module 602e configured to detect whether a capacitance change value included in the capacitance change parameter of the at least one capacitance node accords with a predetermined value, where the predetermined value is different from a capacitance change value of the at least one capacitance node when the at least one capacitance node receives a touch operation, a fifth detection unit 602f configured to detect whether a capacitance change value included in the capacitance change parameter of the node adjacent to the at least one capacitance node is less than or equal to a second preset threshold, and a second determining unit 602g configured to determine that the detection electrode receives the touch operation when the capacitance change value included in the capacitance change parameter of the at least one capacitance node accords with the predetermined value, and the capacitance change value included in the capacitance change parameter of the node adjacent to the at least one capacitance node is less than or equal to the second preset threshold.

In conclusion, according to the operation detection apparatus provided in this embodiment of the present disclosure, a corresponding touch event is generated when it is detected, according to a capacitance change of a capacitance node coupled to an induction electrode disposed in a touch area of a touchscreen and a capacitance change of a capacitance node adjacent to the capacitance node, that a detection electrode disposed outside the touch area of the touchscreen receives a touch operation. An existing capacitance node on the touchscreen identifies a touch operation performed by a user on the detection electrode disposed outside the touchscreen, and a terminal is controlled according to the touch operation. This may further increase a quantity of keys of the terminal and expand a control manner of the terminal with only a need to occupy quite small space and spend quite low costs. Therefore, user experience is improved.

Further, according to the operation detection apparatus provided in this embodiment of the present disclosure, that the user performs a touch operation on the detection electrode is determined when it is detected that capacitance change values of all capacitance nodes corresponding to N induction sub-electrodes meet a condition, and that capacitance change values of other adjacent capacitance nodes do not meet the condition. Therefore, a possibility of erroneous detection is further reduced, and detection accuracy is improved.

In addition, according to the operation detection apparatus provided in this embodiment of the present disclosure, that the user performs a touch operation on the detection electrode is determined when it is detected that the capacitance change values of the capacitance nodes separately corresponding to the N induction sub-electrodes are set to be in a preset proportion. Therefore, the possibility of erroneous detection is further reduced, and the detection accuracy is improved.

Figure 11:
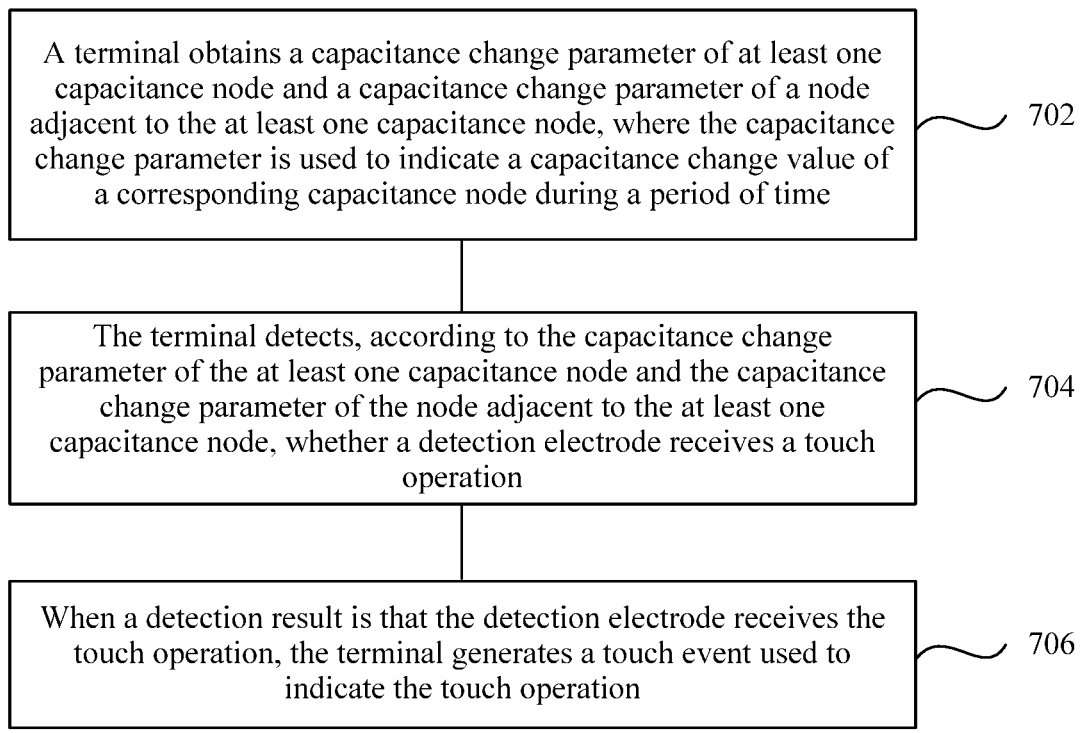
FIG. 11 is a method flowchart of an operation detection method according to an embodiment of the present disclosure.

Referring to FIG. 11, FIG. 11 shows a method flowchart of an operation detection method according to an embodiment of the present disclosure. The method may be applied to a terminal including a touchscreen, a controller connected to the touchscreen, and at least one touch control unit, where the touch control unit includes a detection electrode, an induction electrode, and a conducting wire connecting the detection electrode and the induction electrode. The detection electrode is located outside a touch area of the touchscreen, the induction electrode is located in the touch area of the touchscreen, and the induction electrode is coupled to at least one capacitance node on the touchscreen. The operation detection method may include the following steps.

Step 702: The terminal obtains a capacitance change parameter of the at least one capacitance node and a capacitance change parameter of a node adjacent to the at least one capacitance node, where the capacitance change parameter is used to indicate a capacitance change value of a corresponding capacitance node during a period of time.

Step 704: The terminal detects, according to the capacitance change parameter of the at least one capacitance node and the capacitance change parameter of the node adjacent to the at least one capacitance node, whether the detection electrode receives a touch operation.

Step 706: When a detection result is that the detection electrode receives the touch operation, the terminal generates a touch event used to indicate the touch operation.

In conclusion, according to the operation detection method provided in this embodiment of the present disclosure, a corresponding touch event is generated when it is detected, according to a capacitance change of a capacitance node coupled to an induction electrode disposed in a touch area of a touchscreen and a capacitance change of a capacitance node adjacent to the capacitance node, that a detection electrode disposed outside the touch area of the touchscreen receives a touch operation. An existing capacitance node on the touchscreen identifies a touch operation performed by a user on the detection electrode disposed outside the touchscreen, and a terminal is controlled according to the touch operation. This may further increase a quantity of keys of the terminal and expand a control manner of the terminal with only a need to occupy quite small space and spend quite low costs. Therefore, user experience is improved.

Figure 12:
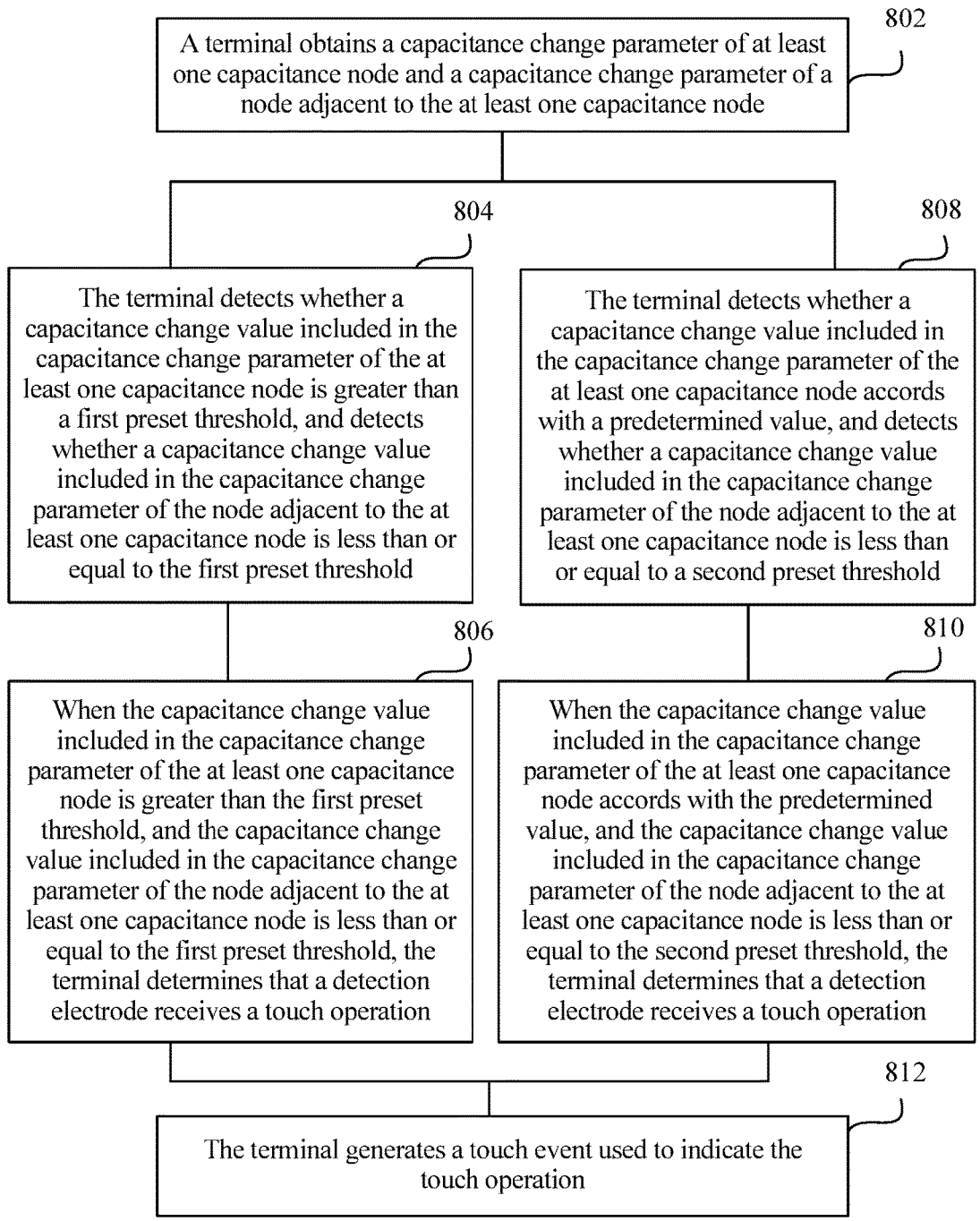
FIG. 12 is a method flowchart of an operation detection method according to another embodiment of the present disclosure.

For further description of the foregoing embodiment corresponding to FIG. 11, refer to FIG. 12. FIG. 12 shows a method flowchart of an operation detection method according to another embodiment of the present disclosure. The method may be applied to a terminal including a touchscreen, a controller connected to the touchscreen, and at least one touch control unit, where the touch control unit includes a detection electrode, an induction electrode, and a conducting wire connecting the detection electrode and the induction electrode. The detection electrode is located outside a touch area of the touchscreen, the induction electrode is located in the touch area of the touchscreen, and the induction electrode is coupled to at least one capacitance node on the touchscreen. For example, the terminal may be the terminal shown in FIG. 1 or FIG. 2. The operation detection method may include the following steps.

Step 802: The terminal obtains a capacitance change parameter of the at least one capacitance node and a capacitance change parameter of a node adjacent to the at least one capacitance node.

The capacitance change parameter indicates a capacitance change value of a corresponding capacitance node during a period of time. The terminal includes the at least one touch control unit. For a structure of the touch control unit, refer to FIG. 1 or FIG. 2, and details are not described herein.

Step 804: The terminal detects whether a capacitance change value included in the capacitance change parameter of the at least one capacitance node is greater than a first preset threshold, and detects whether a capacitance change value included in the capacitance change parameter of the node adjacent to the at least one capacitance node is less than or equal to the first preset threshold.

Step 806: When the capacitance change value included in the capacitance change parameter of the at least one capacitance node is greater than the first preset threshold, and the capacitance change value included in the capacitance change parameter of the node adjacent to the at least one capacitance node is less than or equal to the first preset threshold, the terminal determines that the detection electrode receives a touch operation.

Before that the detection electrode receives the touch operation is determined, whether capacitance change values included in capacitance change parameters of capacitance nodes that are separately coupled to N induction sub-electrodes are in a preset proportion is detected. The step of determining that the detection electrode receives the touch operation is executed when the capacitance change values included in the capacitance change parameters of the capacitance nodes that are separately coupled to the N induction sub-electrodes are in the preset proportion, where the induction electrode includes the N induction sub-electrodes, the N induction sub-electrodes are insulated from each other, the capacitance nodes that are separately coupled to the N induction sub-electrodes are not adjacent to each other, and N≥2.

For a process in which the terminal detects that the detection electrode in the touch control unit receives a user operation, refer to description in the embodiment corresponding to FIG. 2, and details are not described herein.

Step 808: The terminal detects whether a capacitance change value included in the capacitance change parameter of the at least one capacitance node accords with a predetermined value, and detects whether a capacitance change value included in the capacitance change parameter of the node adjacent to the at least one capacitance node is less than or equal to a second preset threshold.

The predetermined value is different from a capacitance change value of the at least one capacitance node when the at least one capacitance node receives a touch operation.

Step 810: When the capacitance change value included in the capacitance change parameter of the at least one capacitance node accords with the predetermined value, and the capacitance change value included in the capacitance change parameter of the node adjacent to the at least one capacitance node is less than or equal to the second preset threshold, the terminal determines that the detection electrode receives the touch operation.

For a process in which the terminal detects that the detection electrode in the touch control unit receives a user operation, refer to description in the embodiment corresponding to FIG. 2, and details are not described herein.

Step 812: The terminal generates a touch event used to indicate the touch operation.

In conclusion, according to the operation detection method provided in this embodiment of the present disclosure, a corresponding touch event is generated when it is detected, according to a capacitance change of a capacitance node coupled to an induction electrode disposed in a touch area of a touchscreen and a capacitance change of a capacitance node adjacent to the capacitance node, that a detection electrode disposed outside the touch area of the touchscreen receives a touch operation. An existing capacitance node on the touchscreen identifies a touch operation performed by a user on the detection electrode disposed outside the touchscreen, and a terminal is controlled according to the touch operation. This may further increase a quantity of keys of the terminal and expand a control manner of the terminal with only a need to occupy quite small space and spend quite low costs. Therefore, user experience is improved.

Further, according to the operation detection method provided in this embodiment of the present disclosure, that the user performs a touch operation on the detection electrode is determined when it is detected that capacitance change values of all capacitance nodes corresponding to N induction sub-electrodes meet a condition, and that capacitance change values of other adjacent capacitance nodes do not meet the condition. Therefore, a possibility of erroneous detection is further reduced, and detection accuracy is improved.

In addition, according to the operation detection method provided in this embodiment of the present disclosure, that the user performs a touch operation on the detection electrode is determined when it is detected that the capacitance change values of the capacitance nodes separately corresponding to the N induction sub-electrodes are set to be in a preset proportion. Therefore, the possibility of erroneous detection is further reduced, and the detection accuracy is improved.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An operation detection apparatus, applied to a terminal comprising a touchscreen, a controller connected to the touchscreen, and at least one touch control unit, wherein the touch control unit comprises a detection electrode, an induction electrode, and a conducting wire connecting the detection electrode and the induction electrode, wherein the detection electrode is located outside a touch area of the touchscreen, wherein the induction electrode is located in the touch area of the touchscreen, wherein the induction electrode is coupled to at least one capacitance node on the touchscreen, and wherein the apparatus comprises:
   a memory; and
   a processor coupled to the memory and configured to:
      obtain a capacitance change parameter of the at least one capacitance node and a capacitance change parameter of a capacitance node adjacent to the at least one capacitance node, wherein a capacitance change parameter indicates a capacitance change value of a corresponding capacitance node during a period of time;
      detect, according to the capacitance change parameter of the at least one capacitance node and the capacitance change parameter of the capacitance node adjacent to the at least one capacitance node, whether the detection electrode receives a touch operation; and
      generate a touch event indicating the touch operation when a detection result comprises that the detection electrode receives the touch operation.

2. The apparatus according to claim 1, wherein the processor is further configured to:
   detect whether a capacitance change value comprised in the capacitance change parameter of the at least one capacitance node is greater than a first preset threshold;
   detect whether a capacitance change value comprised in the capacitance change parameter of the capacitance node adjacent to the at least one capacitance node is less than or equal to the first preset threshold; and
   determine that the detection electrode receives the touch operation when the capacitance change value comprised in the capacitance change parameter of the at least one capacitance node is greater than the first preset threshold, and the capacitance change value comprised in the capacitance change parameter of the capacitance node adjacent to the at least one capacitance node is less than or equal to the first preset threshold.

3. The apparatus according to claim 1, wherein the processor is further configured to:
   detect, before determining that the detection electrode receives the touch operation, whether capacitance change values comprised in capacitance change parameters of capacitance nodes that are separately coupled to N induction sub-electrodes are in a preset proportion; and
   determine that the detection electrode receives the touch operation when the capacitance change values comprised in the capacitance change parameters of the capacitance nodes that are separately coupled to the N induction sub-electrodes are in the preset proportion, wherein the induction electrode comprises the N induction sub-electrodes, wherein the N induction sub-electrodes are insulated from each other, wherein the capacitance nodes that are separately coupled to the N induction sub-electrodes are not adjacent to each other, wherein N is an integer, and wherein N≥2.

4. The apparatus according to claim 1, wherein the processor is further configured to:
  detect whether a capacitance change value comprised in the capacitance change parameter of the at least one capacitance node accords with a predetermined value, wherein the predetermined value is different from the capacitance change value of the at least one capacitance node when the at least one capacitance node receives the touch operation;
  detect whether a capacitance change value comprised in the capacitance change parameter of the capacitance node adjacent to the at least one capacitance node is less than or equal to a second preset threshold; and
  determine that the detection electrode receives the touch operation when the capacitance change value comprised in the capacitance change parameter of the at least one capacitance node accords with the predetermined value, and the capacitance change value comprised in the capacitance change parameter of the capacitance node adjacent to the at least one capacitance node is less than or equal to the second preset threshold.

5. An operation detection method, applied to a terminal comprising a touchscreen, a controller connected to the touchscreen, and at least one touch control unit, wherein the touch control unit comprises a detection electrode, an induction electrode, and a conducting wire connecting the detection electrode and the induction electrode, wherein the detection electrode is located outside a touch area of the touchscreen, wherein the induction electrode is located in the touch area of the touchscreen, wherein the induction electrode is coupled to at least one capacitance node on the touchscreen, and wherein the method comprises:
  acquiring, by the terminal, a capacitance change parameter of the at least one capacitance node and a capacitance change parameter of a capacitance node adjacent to the at least one capacitance node, wherein a capacitance change parameter indicates a capacitance change value of a corresponding capacitance node during a period of time;
  detecting, by the terminal according to the capacitance change parameter of the at least one capacitance node and the capacitance change parameter of the capacitance node adjacent to the at least one capacitance node, whether the detection electrode receives a touch operation; and
  generating, by the terminal when a detection result is comprises that the detection electrode receives the touch operation, a touch event indicating the touch operation.

6. The method according to claim 5, wherein detecting whether the detection electrode receives the touch operation comprises:
  detecting whether a capacitance change value comprised in the capacitance change parameter of the at least one capacitance node is greater than a first preset threshold;
  detecting whether a capacitance change value comprised in the capacitance change parameter of the capacitance node adjacent to the at least one capacitance node is less than or equal to the first preset threshold; and
  determining that the detection electrode receives the touch operation when the capacitance change value comprised in the capacitance change parameter of the at least one capacitance node is greater than the first preset threshold, and the capacitance change value comprised in the capacitance change parameter of the capacitance node adjacent to the at least one capacitance node is less than or equal to the first preset threshold.

7. The method according to claim 5, further comprising:
  detecting, by the terminal before determining that the detection electrode receives the touch operation, whether capacitance change values comprised in capacitance change parameters of capacitance nodes that are separately coupled to N induction sub-electrodes are in a preset proportion; and
  determining that the detection electrode receives the touch operation, by the terminal when the capacitance change values comprised in the capacitance change parameters of the capacitance nodes that are separately coupled to the N induction sub-electrodes are in the preset proportion, wherein the induction electrode comprises the N induction sub-electrodes, wherein the N induction sub-electrodes are insulated from each other, wherein the capacitance nodes that are separately coupled to the N induction sub-electrodes are not adjacent to each other, wherein N is an integer, and wherein N≥2.

8. The method according to claim 5, wherein detecting whether the detection electrode receives the touch operation comprises:
  detecting whether a capacitance change value comprised in the capacitance change parameter of the at least one capacitance node accords with a predetermined value;
  detecting whether a capacitance change value comprised in the capacitance change parameter of the capacitance node adjacent to the at least one capacitance node is less than or equal to a second preset threshold, wherein the predetermined value is different from the capacitance change value of the at least one capacitance node when the at least one capacitance node receives the touch operation; and
  determining that the detection electrode receives the touch operation when the capacitance change value comprised in the capacitance change parameter of the at least one capacitance node accords with the predetermined value, and the capacitance change value comprised in the capacitance change parameter of the capacitance node adjacent to the at least one capacitance node is less than or equal to the second preset threshold.

9. A terminal, comprising:
  a touchscreen;
  a controller connected to the touchscreen; and
  at least one touch control unit, comprising:
    a detection electrode located outside a touch area of the touchscreen;
    an induction electrode located in the touch area of the touchscreen and coupled to at least one capacitance node on the touchscreen; and
    a conducting wire connecting the detection electrode and the induction electrode,
  wherein the controller is configured to:
    obtain a capacitance change parameter of the at least one capacitance node and a capacitance change parameter of a capacitance node adjacent to the at least one capacitance node, wherein a capacitance change parameter indicates a capacitance change value of a corresponding capacitance node during a period of time;
    detect, according to the capacitance change parameter of the at least one capacitance node and the capacitance change parameter of the capacitance node adjacent to the at least one capacitance node, whether the detection electrode receives a touch operation; and generate a touch event indicating the touch operation when a detection result comprises that the detection electrode receives the touch operation.

10. The terminal according to claim 9, wherein the controller is further configured to:

detect whether a capacitance change value comprised in the capacitance change parameter of the at least one capacitance node is greater than a first preset threshold;

detect whether a capacitance change value comprised in the capacitance change parameter of the capacitance node adjacent to the at least one capacitance node is less than or equal to the first preset threshold; and determine that the detection electrode receives the touch operation when the capacitance change value comprised in the capacitance change parameter of the at least one capacitance node is greater than the first preset threshold, and the capacitance change value comprised in the capacitance change parameter of the capacitance node adjacent to the at least one capacitance node is less than or equal to the first preset threshold.

11. The terminal according to claim 9, wherein the controller is further configured to:

detect, before determining that the detection electrode receives the touch operation, whether capacitance change values comprised in capacitance change parameters of capacitance nodes that are separately coupled to N induction sub-electrodes are in a preset proportion; and determine that the detection electrode receives the touch operation when the capacitance change values comprised in the capacitance change parameters of the capacitance nodes that are separately coupled to the N induction sub-electrodes are in the preset proportion, wherein the induction electrode comprises the N induction sub-electrodes, wherein the N induction sub-electrodes are insulated from each other, wherein the capacitance nodes that are separately coupled to the N induction sub-electrodes are not adjacent to each other, wherein N is an integer, and wherein N≥2.

12. The terminal according to claim 9, wherein the controller is further configured to:

detect whether a capacitance change value comprised in the capacitance change parameter of the at least one capacitance node accords with a predetermined value, wherein the predetermined value is different from the capacitance change value of the at least one capacitance node when the at least one capacitance node receives the touch operation;

detect whether a capacitance change value comprised in the capacitance change parameter of the capacitance node adjacent to the at least one capacitance node is less than or equal to a second preset threshold; and determine that the detection electrode receives the touch operation when the capacitance change value comprised in the capacitance change parameter of the at least one capacitance node accords with the predetermined value, and the capacitance change value comprised in the capacitance change parameter of the capacitance node adjacent to the at least one capacitance node is less than or equal to the second preset threshold.

13. A touch control unit, applied to a terminal comprising a touchscreen and a controller, wherein the touch control unit comprises:

a detection electrode located outside a touch area of the touchscreen;

an induction electrode located in the touch area of the touchscreen; and a conducting wire connecting the detection electrode and the induction electrode;

wherein the induction electrode is coupled to at least one capacitance node on the touchscreen such that the controller generates a touch event indicating a touch operation when detecting, according to a capacitance change parameter of the at least one capacitance node and a capacitance change parameter of a capacitance node adjacent to the at least one capacitance node, that the detection electrode receives the touch operation, and wherein a capacitance change parameter indicates a capacitance change value of a corresponding capacitance node during a period of time.

14. The touch control unit according to claim 13, wherein the induction electrode comprises N induction sub-electrodes, wherein the N induction sub-electrodes are insulated from each other, wherein capacitance nodes that are separately coupled to the N induction sub-electrodes are not adjacent to each other, wherein N is an integer, and wherein N≥2.

15. The touch control unit according to claim 14, wherein the detection electrode is a single electrode, and wherein the N induction sub-electrodes are separately connected to the detection electrode using the conducting wire.

16. The touch control unit according to claim 14, wherein capacitance change parameters of the capacitance nodes separately corresponding to the N induction sub-electrodes are in a preset proportion when the detection electrode receives the touch operation.

17. The touch control unit according to claim 14, wherein the detection electrode comprises N detection sub-electrodes, wherein the N detection sub-electrodes are insulated from each other, and wherein the N detection sub-electrodes are connected to the N induction sub-electrodes in a one-to-one correspondence manner using the conducting wire.

18. The touch control unit according to claim 14, wherein an area of each induction sub-electrode does not exceed an area of two capacitance nodes.

19. The touch control unit according to claim 14, wherein a width of a part of the conducting wire passing through a capacitance node on the touchscreen ≤1 millimeter (mm).

20. The touch control unit according to claim 14, wherein a capacitance change value of the at least one capacitance node accords with a predetermined value when the detection electrode receives the touch operation, and wherein the predetermined value is different from the capacitance change value of the at least one capacitance node when the at least one capacitance node receives the touch operation.

21. A touchscreen, comprising:

at least one touch control unit, wherein the at least one touch control unit comprises:

a detection electrode located outside a touch area of the touchscreen;

an induction electrode located in the touch area of the touchscreen; and a conducting wire connecting the detection electrode and the induction electrode, wherein the induction electrode is coupled to at least one capacitance node on the touchscreen such that the controller generates a touch event indicating a touch operation when detecting, according to a capacitance change parameter of the at least one capacitance node and a capacitance change parameter of a capacitance node adjacent to the at least one capacitance node, that the detection electrode receives the touch operation, and wherein a capacitance change parameter indicates a capacitance change value of a corresponding capacitance node during a period of time.

22. A screen protector, comprising:

at least one touch control unit and configured to cover an upper surface of a touchscreen, wherein the at least one touch control unit comprises:

a detection electrode located outside a touch area of the touchscreen;

an induction electrode located in the touch area of the touchscreen; and a conducting wire connecting the detection electrode and the induction electrode, wherein the induction electrode is coupled to at least one capacitance node on the touchscreen such that the controller generates a touch event indicating a touch operation when detecting, according to a capacitance change parameter of the at least one capacitance node and a capacitance change parameter of a capacitance node adjacent to the at least one capacitance node, that the detection electrode receives the touch operation, and wherein a capacitance change parameter indicates a capacitance change value of a corresponding capacitance node during a period of time.

* * * * *

UNITED STATES PATENT AND TRADEMARK OFFICE
CERTIFICATE OF CORRECTION

PATENT NO. : 10,175,840 B2
APPLICATION NO. : 15/508210
DATED : January 8, 2019
INVENTOR(S) : Jin Zhou et al.

Page 1 of 1

It is certified that error appears in the above-identified patent and that said Letters Patent is hereby corrected as shown below:

In the Claims

Column 33, Line 47: delete "is-"

Signed and Sealed this
Fifth Day of March, 2019

Andrei Iancu
*Director of the United States Patent and Trademark Office*